US007002556B2

(12) United States Patent
Tsukada et al.

(10) Patent No.: US 7,002,556 B2
(45) Date of Patent: Feb. 21, 2006

(54) TOUCH RESPONSIVE DISPLAY UNIT AND METHOD

(75) Inventors: Yujin Tsukada, Tokyo (JP); Masaki Takano, Musashino (JP)

(73) Assignee: Hitachi, Ltd., Tokyo (JP)

( * ) Notice: Subject to any disclaimer, the term of this patent is extended or adjusted under 35 U.S.C. 154(b) by 281 days.

(21) Appl. No.: 10/173,106

(22) Filed: Jun. 18, 2002

(65) Prior Publication Data

US 2002/0196238 A1  Dec. 26, 2002

(30) Foreign Application Priority Data

Jun. 20, 2001 (JP) ............................. 2001-186866

(51) Int. Cl.
  *G09G 5/00* (2006.01)
(52) U.S. Cl. ...................... 345/173; 345/156
(58) Field of Classification Search ............. 345/156, 345/157, 173, 174, 179, 168, 169, 175, 176, 345/178; 178/18.01, 18.02–18.08, 19.02; 340/407.1, 562; 200/512
  See application file for complete search history.

(56) References Cited

U.S. PATENT DOCUMENTS

| | | | | |
|---|---|---|---|---|
| 5,825,352 A | * | 10/1998 | Bisset et al. ............... | 345/173 |
| 5,956,021 A | * | 9/1999 | Kubota et al. ............. | 345/179 |
| 6,262,717 B1 | * | 7/2001 | Donohue et al. ........... | 345/173 |
| 6,611,258 B1 | * | 8/2003 | Tanaka et al. ............. | 345/179 |
| 6,624,803 B1 | * | 9/2003 | Vanderheiden et al. ..... | 345/156 |
| 6,738,048 B1 | * | 5/2004 | Rundel ....................... | 345/173 |
| 6,825,832 B1 | * | 11/2004 | Chung et al. ............... | 345/168 |
| 2001/0013861 A1 | * | 8/2001 | Shimizu ..................... | 345/173 |
| 2002/0180767 A1 | * | 12/2002 | Northway et al. .......... | 345/698 |

FOREIGN PATENT DOCUMENTS

| | | | |
|---|---|---|---|
| EP | 1093050 A2 | * | 10/1999 |
| JP | 5-216587 | | 6/1992 |
| JP | 05-224816 | * | 9/1993 |
| JP | 9-101864 | | 10/1995 |
| JP | 9-212301 | | 2/1996 |

* cited by examiner

*Primary Examiner*—Bipin Shalwala
*Assistant Examiner*—Nitin Patel
(74) *Attorney, Agent, or Firm*—Reed Smith LLP; Stanley P. Fisher, Esq.; Juan Carlos A. Marquez, Esq.

(57) ABSTRACT

As shown in FIG. 3A, a touch panel 2 is provided on a display screen 1, and a touch panel 3 using infrared rays is provided thereon. A shown in FIG. 3B, when a finger 6 touches the touch panel 3, its touching position is detected, and screen displaying is carried out on the display screen 1 according to the touching position. Then, the finger 6 is brought closer to the display screen 1. Accordingly, as shown in FIG. 3C, when the finger 6 touches the touch panel 2, its touching position is detected, and screen displaying is carried out on the display screen 1 according to the touching position. For example, in the case of an operation button 7, in FIG. 3B, displaying is carried out in a state different from that of FIG. 3A and, in FIG. 3C, displaying is carried out in another different state.

7 Claims, 16 Drawing Sheets

FIG. 5A  FIG. 5B  FIG. 5C
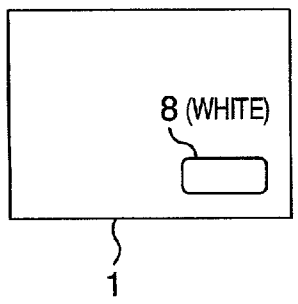 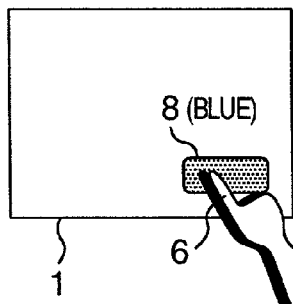 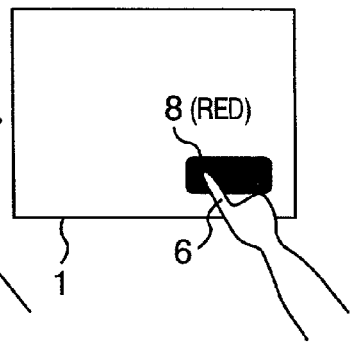
FIG. 6A  FIG. 6B  FIG. 6C
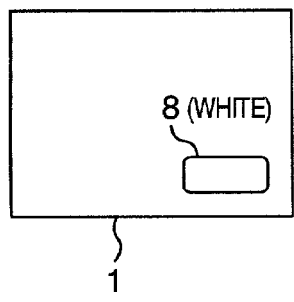 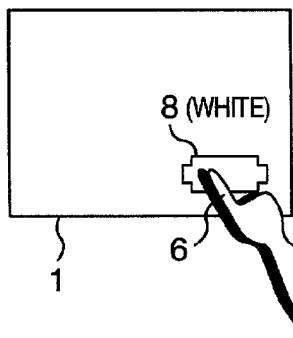 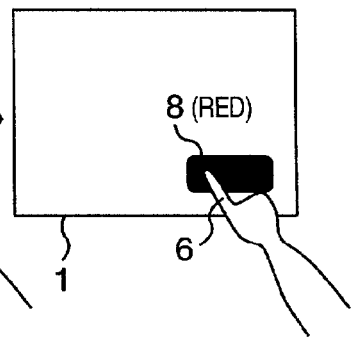
FIG. 7A  FIG. 7B  FIG. 7C
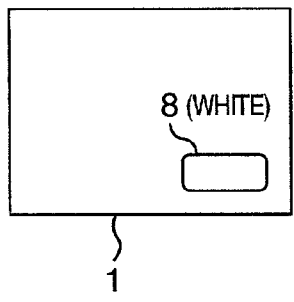 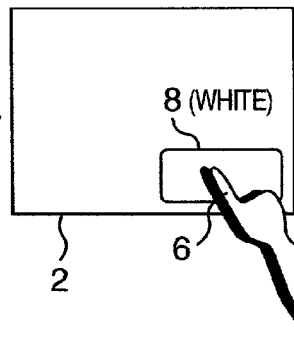 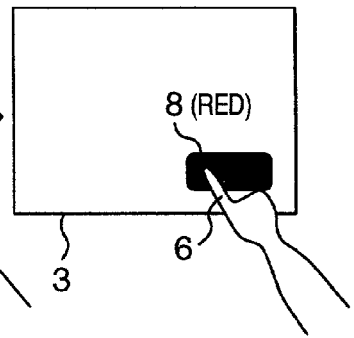

TOUCH RESPONSIVE DISPLAY UNIT AND METHOD

BACKGROUND OF THE INVENTION

The present invention relates to a touch responsive display unit and a display method used for a terminal device of a stand alone type or a portable type.

In recent years, use of terminal devices has spread to various industrial fields. For example, automatic teller machines (ATM) have been installed at banks or the like, and ticket-vending machines and map guiding machines have been installed at stations, thereby enabling parts of work to be handled by the terminal devices at the banks, stations and the like. Even at stores such as fast-food restaurants, terminal devices may be used for processing orders of goods (e.g., JP-A-5-216587). Further, terminal devices for receiving contents delivered through a communication network such as Internet, terminal devices for web browsing, and the like have been realized or presented.

Such a terminal device includes a display (display unit). Various operations described above can be carried out by operating input unit such as a keyboard while referring to information such as a message displayed on the display screen. Now, a touch responsive display unit has been made available, which can carry out various operations by providing the display screen with a function as input unit, and operating the screen according to a message, a menu or the like displayed on the display screen.

According to such a touch responsive display unit, since operations are carried out by directly touching the display screen with fingers, high operability can be achieved, where the operations are easy. Moreover, since the number of operation buttons can be reduced at an operation unit such as a keyboard, the terminal device itself can be made compact, and installation space can be reduced, increasing freedom for installation places in the stores or the stations, and other advantages can be provided.

SUMMARY OF THE INVENTION

However, in the terminal device using the foregoing touch responsive display unit, images are displayed on the display unit by the input unit such as the operation button (touch key), the input unit is visually recognized by a customer (user) and, based on this recognition, a place of the image of the input unit is touched for operation, consequently causing various problems.

First, regarding displaying by an operation button, a function of the operation button may not be known until it is depressed (operated). For example, there is a limit to a size of the display screen of the terminal device of the stand along type. When many operation buttons are displayed on the screen, even if a function of each operation button is displayed, the function displayed becomes obscure. Especially, for the visually impaired or the old, handling is difficult if function explanation of the operation buttons is displayed small.

Even when a given position on the display screen of the touch responsive display unit is touched as an operation position, it may be different from a detected position of a position detection sensor. Thus, even if the user thinks that he has operated, the display unit may not be operated, or operated in an unexpected manner. This is attributed to deviation between the position of the operation button seen by the user and the detected position of the sensor, which is caused by, for example a height of the user or user's standing position in a horizontal direction with respect to the touch responsive display unit. In the case of the keyboard, when the operation button is touched, recognition can be made by its feel. However, in the case of the display screen of the touch responsive display unit, as the screen has a smooth surface as a whole, touching of the operation button cannot be recognized by its feel.

Further, when many operation buttons are displayed on the display screen, displaying of each operation button becomes small. Consequently, trying to touch a desired operation button, only by slight touching, or in the case of user having thick fingers, by touching an adjacent operation button, an operation becomes difficult, necessitating a very careful operation.

Further, on the display screen, not only the operation buttons but also messages, information and the like may need to be simultaneously displayed. In such a case, which are for the operation buttons are not clear, or information sentences may be too small to be read. Especially, in the case of a user unused to such a touch panel or the old, the operation buttons cannot be quickly recognized.

In addition, in the touch responsive display unit, since the touch panel is superposed on the display, a light transmittance state of the touch panel is bad, obscuring a displayed content.

Therefore, objects of the present invention are to provide a touch responsive display unit and a display method, capable of solving the foregoing problems, facilitating recognition as to a displayed content such as displayed operation buttons, and facilitating an operation to enhance operability.

In order to achieve the foregoing object, in accordance with the present invention, there is provided a touch responsive display unit comprising: a second touch panel disposed on a display screen; a first touch panel disposed on the second touch panel; first position detecting unit for detecting a touching position of an indicator on the first touch panel when the indicator designates a predetermined position on the display screen; second position detecting unit for detecting a touching position of the indicator on the second touch panel when the indicator designates the predetermined position on the display screen; and control unit for executing first transaction according to a detection result of the first position detecting unit, setting a display state on the display screen to a first display state according to the touching position of the indicator on the first touch panel detected by the first position detecting unit, executing second transaction according to a detection result of the second position detecting unit, and setting a display state on the display screen to a second display state according to the touching position of the indicator on the second touch panel detected by the second position detecting unit.

Operation buttons are displayed on the display screen, the touching positions of the indicator are in positions on the first and second touch panels of the indicator designating the operation buttons, and the control unit sets display states of the operation buttons to the first and second states according to the detection results of the first and second position detecting unit.

A plurality of operation buttons are displayed on the display screen, the touching positions of the indicator are in positions on the first and second touch panels of the indicator designating the respective operation buttons, and the first display state displays information regarding the operation buttons designated by the indicator according to the detection result of the first position detecting unit.

An area for displaying character or other messages is set on the display screen, and the control unit displays a part or all parts of the area in an enlarged manner when at least the first position detecting unit detects a touching position an corresponding to the area.

A hiding area for hiding a predetermined image is set on the display screen, and the first display state opens an area of a predetermined size including an indication point by the indicator in the hiding area according to the detection result of the first position detecting unit, and displays a part of the hidden predetermined image from the open area. In this case, the predetermined image is for a keyboard including at least ten keys.

A detailed image, and a schematic image indicating only a main portion of the detailed image are provided, the schematic image is displayed on the display screen, and the first display state displays the detailed image at an indication point by the indicator in the schematic image according to the detection result of the first position detecting unit.

A plurality of icons are displayed on the display screen, the first display state enables the icons designated by the indicator to be moved associatively with a movement of the indicator according to the detection result of the first position detecting unit, and the second display unit fixes positions of the icons designated by the indicator according to the detection result of the second position detecting unit.

The first display state displays a pointer at an indication point by the indicator according to the detection result of the first position detecting unit, and the second display state designates and decides an indication point by the pointer.

The first display state displays an image of an operation panel in a position designated by the indicator on the display screen according to the detection result of the first position detecting unit.

The first display state displays an image of a pen in the position designated by the indicator on the display screen, moves the pen associatively with a movement of the indicator, and displays a moving track of the pen, according to the detection result of the first position detecting unit, and the second display state decides displaying of the track of the pen.

The control unit displays a warning image on the display screen as the first display state when the first position detecting unit detects two or more touching positions on the first touch panel.

According to the other embodiment of the present invention, a second touch panel is disposed on a lower portion of a screen of a flexible paper display. A first touch panel is disposed on the screen of the paper display, and the second touch panel is disposed on the lower portion of the paper display.

Other objects, features and advantages of the invention will become apparent from the following description of the embodiments of the invention taken in conjunction with the accompanying drawings.

BRIEF DESCRIPTION OF THE DRAWINGS

FIGS. 5A to 5C are views, each showing a first specific example of a change in displaying on the display screen in the process shown in FIGS. 3A to 3C and FIG. 4.

FIGS. 6A to 6C are views, each showing a second specific example of a change in displaying on the display screen in the process shown in FIGS. 3A–3C and FIG. 4.

FIGS. 7A to 7C are views, each showing a third specific example of a change in displaying on the display screen in the process shown in FIGS. 3A to 3C, and FIG. 4.

DESCRIPTION OF THE EMBODIMENTS

Next, then preferred embodiments of the present invention will be described with reference to the accompanying drawings.

Figure 1:
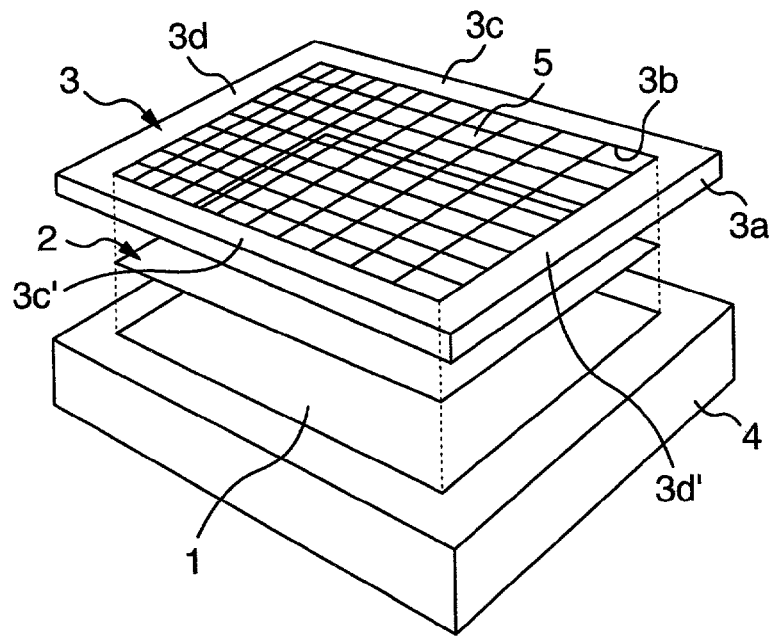
FIG. 1 is a perspective view schematically showing a configuration of a touch responsive display according to an embodiment of the present invention.

FIG. 1 is a perspective view schematically showing a configuration of a touch responsive display unit according to an embodiment of the present invention. A reference numeral 1 denotes a display screen, 2 and 3 touch panels, 3a a frame, 3b a hollow portion, 3c, 3c', 3d and 3d' edges, 4 a control unit, and 5 infrared rays.

In the drawing, the touch panel 2 is installed on the display screen 1 provided integrally with the control unit 4, and another touch panel 3 is installed further thereon. The touch panel 3 has the frame 3a, and a size of the hollow portion 3b inside the frame 3a is set substantially equal to that of the display screen 1. On the hollow portion 3b of the frame 3a, thin beam-shaped infrared rays 5 are radiated vertically from an inner surface of one edge 3c of the frame 3a in a horizontal direction. These infrared rays are detected by a sensor (not shown) provided in an inner surface of the other edge 3c' opposite the edge 3c. Similarly, thin beam-shaped infrared rays 5 are radiated vertically from an inner surface of one edge 3d of the frame 3a in a longitudinal direction. These infrared rays are detected by a sensor (not shown) provided in an inner surface of the other edge 3d' opposite the edge 3d. That is, on the hollow portion 3b of the frame 3a, an infrared ray film is formed, in which many beams of infrared rays 5 are radiated intersecting one another in the horizontal and longitudinal directions. This infrared ray film is laid above the display screen 1, e.g., on a portion of several 10 mm.

When a finger (not shown) is inserted into the hollow portion 3b of the frame 3, the horizontal and longitudinal beams of infrared rays 5 are blocked in its insertion position. By detecting this blocking based on outputs of the sensors provided in the edges 3c' and 3d', the control unit 4 detects the finger insertion position in the hollow portion 3b.

The touch panel 2 detects its touching position when it is touched by a finger. The foregoing infrared-ray type may be employed, but other types such as a resistive type, a capacitive type, and a surface wave type may also be used.

As the touch panels 2 and 3 are provided on the display screen 1, a finger tip is inserted into the hollow portion 3b of the touch panel 3. Two states can be selected, i.e., a state of not touching the touch panel 2 (referred to a state of touching the touch panel 3, hereinafter), and a state of a finger tip touching the touch panel 2 through the hollow portion 3b of the touch panel 3 (referred to a state of touching the touch panel 2, hereinafter). Here, these states are set by different operations on the display screen 1. That is, the state of touching the touch panel 3 is set by a touching operation of the touch panel 3. The state of touching the touch panel 2 is set by a touching operation of the touch panel 2.

Figure 2:
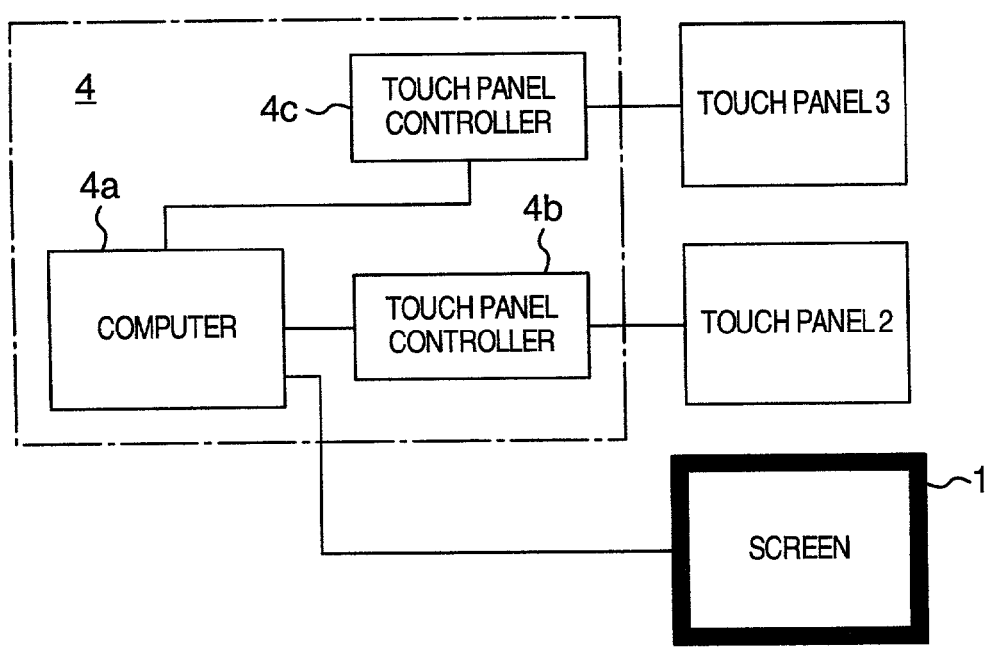
FIG. 2 is a block diagram showing a system configuration of the touch responsive display of FIG. 1.

FIG. 2 is a block diagram showing a system configuration of the touch responsive display unit shown in FIG. 1. A reference numeral 4a denotes a computer, and 4b and 4c touch panel controllers. Portions corresponding to those of FIG. 1 are denoted by similar reference numerals, and repeated explanation will be omitted.

In the drawing, the control unit 4 includes the computer 4a for controlling the touch responsive display unit, and the touch panel controllers 4b and 4c for respectively operating the touch panels 2 and 3 under control of the computer 4a.

The touch panel controller 4c causes infrared rays 5 (FIG. 1) to be emitted to the hollow portion of the touch panel 3 as described above, and processes a detection output of a sensor (not shown) and supplies it to the computer 4a. When the touch panel 2 is similar in configuration to the touch panel 3, the touch panel controller 4b operates similarly to the touch panel controller 4c. When the touch panel 2 detects a touching position by a different method (e.g., resistive type for changing resistance by touching, and thereby detecting a touching position), the touch panel 2 is driven, and its position detection output is processed, and supplied to the computer 4a.

Upon having received touching position detection outputs of the touch panels 2 and 3 from the touch panel controllers 4c and 4b, the computer 4a controls the display screen 1 of the display, and executes screen displaying according to the touching position detection outputs.

Figure 3A:
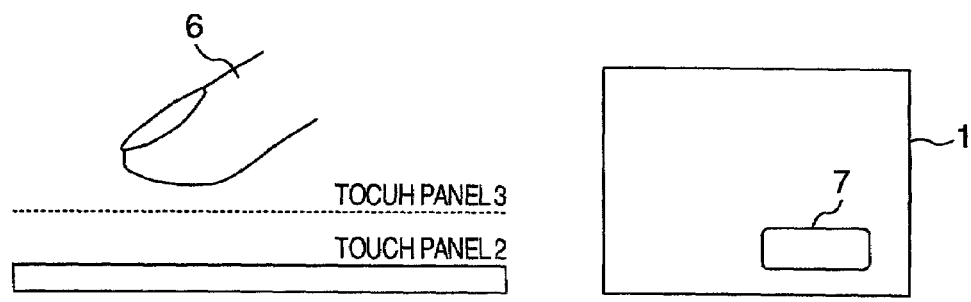
FIGS. 3A to 3C are views, each schematically showing an operation state by a user on the touch responsive display and a corresponding display state on a display screen.
Figure 3B:
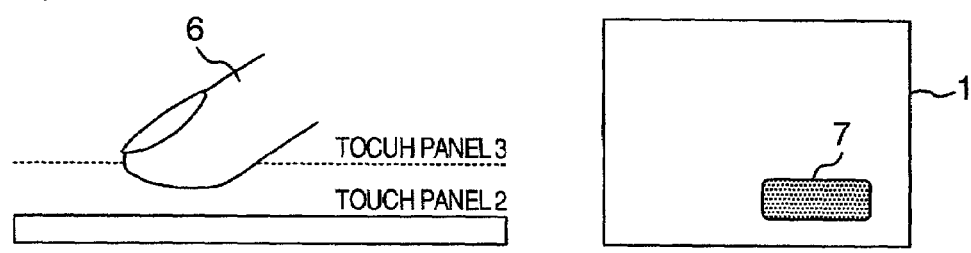
Figure 3C:
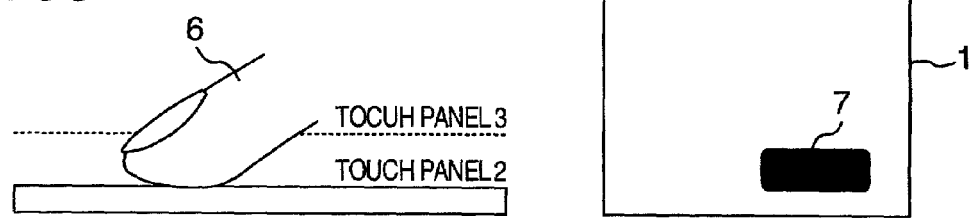
Figure 4:
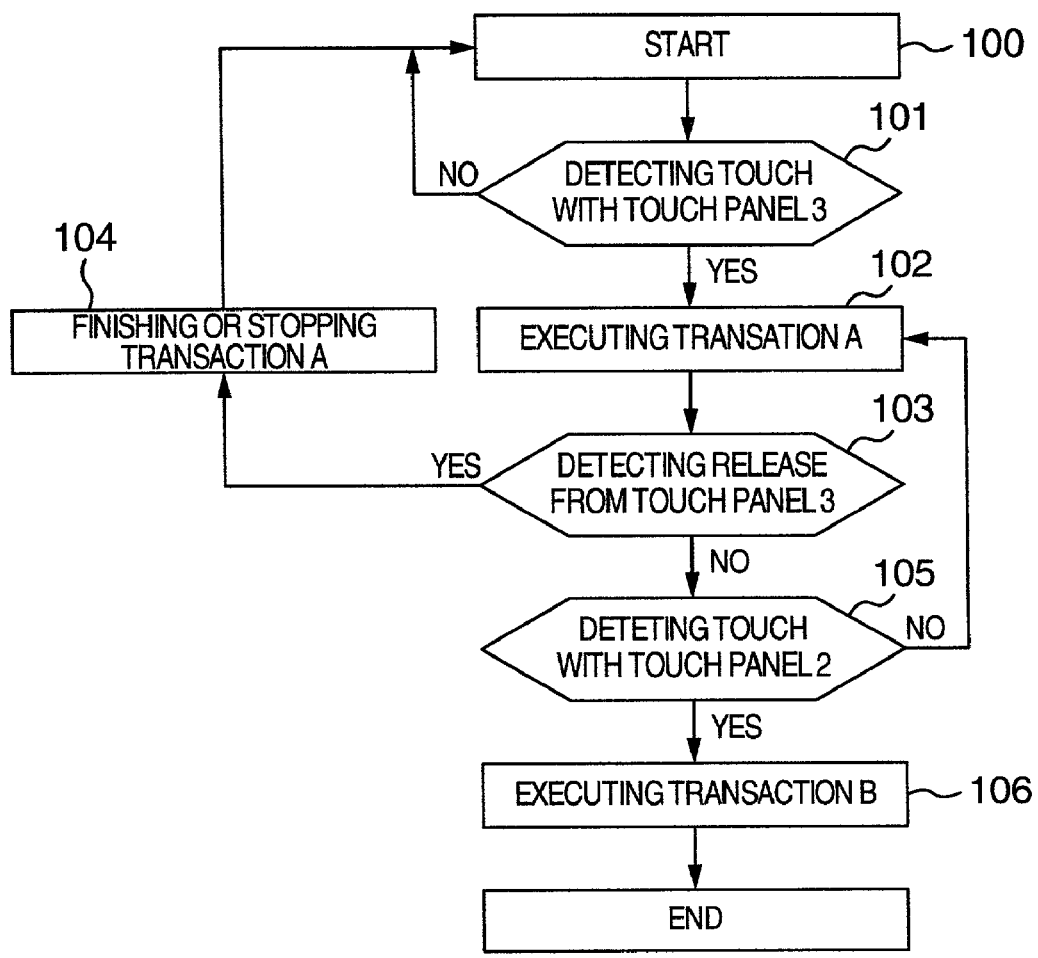
FIG. 4 is a flowchart showing a control process of a display method of the touch responsive display unit of the present invention based on the operation states shown in FIGS. 3A to 3C according to an embodiment.

Next, description will be made of a display method by the computer 4a following a user operation at the touch responsive display unit shown in FIG. 1 according to an embodiment of the present invention by referring to FIGS. 3A to 3C and FIG. 4. FIGS. 3A to 3C are views, each schematically showing a touching operation state of the user at the touch responsive display unit, and a corresponding display state on the display screen 1. A reference numeral 6 denotes a finger tip, and 7 a target touching operation portion on the display screen 1. FIG. 4 is a flowchart showing a control process of the computer 4a according to a touching operation state.

In FIG. 4, as shown in FIG. 3A, while the finger tip 6 is not touching the touch panel 3, the target touching operation portion 7 displayed on the display screen 1 is in an initial display state (step 100). Then, as shown in FIG. 3B, when the finger tip 6 touches the touch panel 3, a position detection result of the finger tip 6 on the touch panel 3 is fetched in by the computer 4a (step 101). The computer 4a executes transaction A based on this detection result, and controls displaying on the display screen 1 (step 102). Accordingly, as shown in FIG. 3B, a displaying method of the target touching operation portion 7 is changed on the display screen 1. In the state shown in FIG. 3B, a series of steps 102, 103 and 105 are repeated as long as the process continues and, on the display screen 1, the display state shown in FIG. 3B continues.

When the finger tip 6 is returned from the state of FIG. 3B to that of FIG. 3A (step 103), the computer 4a finishes or stops the transaction A (step 104), and returns to step 100. The display screen 1 returns to the display state of FIG. 3A.

When the finger tip 6 is further advanced from the state of FIG. 3B, and set in a state of touching the touch panel 2 shown in FIG. 3C, a position detection output of the finger tip 6 of the touch panel 2 is received by the computer 4a (step 105). Based on this detection result, the computer 4a executes transaction B, and controls displaying on the display screen 1 (step 106). Accordingly, as shown in FIG. 3C, a displaying method of the target touching operation portion 7 is changed on the display screen 1 differently those of FIG. 3A and 3C.

When the finger tip 6 changes from the state of FIG. 3C to FIG. 3A, a displaying method of the target touching operation portion 7 is changed from that of FIG. 3C to that of FIG. 3B, and to that of FIG. 3A. However, if the state shown in FIG. 3C indicates a final decision operation at the touch responsive display unit, when the computer 4a determines establishment of this last decision operation after the passage of a fixed period of the state shown in FIG. 3C, the display method may be immediately changed from that of FIG. 3C to that of FIG. 3A (i.e., move from step 106 to 100).

FIGS. 5A to 5C are views, each showing a first specific example of a change in displaying on the display screen in the process shown in FIGS. 3A to 3C, and FIG. 4. A reference numeral 8 denotes an operation button. In this specific example, the operation button 8 changes its color.

FIG. 5A shows a display state of the operation button 8 on the display screen 1 while the finer tip 6 is not touching the touch panel 3 as shown in FIG. 3A. In this state, the operation button 8 is displayed in initial color. Here, for example, it is assumed that the operation button 8 is displayed in white. In this display state, the finger tip 6 is brought close to the operation button 8 and, when the finger tip 6 touches the touch panel 3 as shown in FIG. 3B (step 101 of FIG. 4), as shown in FIG. 5B, the display color of the operation button 8 is changed (execution of transaction A: step 102 of FIG. 4). Here, for example, the color is changed to blue. Hereinafter, as shown in FIG. 5B, when the finger tip 6 is shadowed, it is assumed that the finger tip 6 shown in FIG. 3B touches the touch panel 3. Further, when the finger tip 6 touches the touch panel 2 as shown in FIG. 3C, as shown in FIG. 5C, the display color of the operation button 8 is further changed (execution of transaction B: step 106 of FIG. 4). Here, for example, the color is changed to red. Hereinafter, as shown in FIG. 5C, when the finger tip 6 is un-shadowed, it is assumed that the finger tip 6 shown in FIG. 3C touches the touch panel 2.

Thus, in the first specific example, when the finger tip 6 touches the touch panel 3, that is, when the finger tip 6 approaches the display screen 1, the approaching of the finger tip 6 causes the color of the operation button 8 displayed on the display screen 8 to be changed. Accordingly, the user can accurately check whether he has selected the operation button 8 to be operated or not. When the display color of the operation button 8 is further changed as a result of touching the display portion of the operation button 8 on the touch panel 2 by the finger tip 6, the user can determine that the operation button 8 has been correctly operated by touching. This is effective, for example, as described above when deviation occurs between a position of the operation button seen from user and a position of the sensor depending on user's height or user's standing position in a horizontal direction with respect to the touch responsive display unit.

If a size of deviation or a direction is known beforehand, shifting of the setting positions of the touch panels 2 and 3 in an opposite direction by an amount equal to the size of the deviation is effective.

Because of the deviation, a coordinate detected on the touch panel 3 is different from that detected on the touch panel 2. When it is in a state of touching the touch panel 3, the finger tip is within a button area. However, when it touches the touch panel 2, the finger tip may be shifted from the button area. To solve this problem, a method is available, in which only touching or not is determined without detecting a coordinate on the touch panel 2, and position information is detected only on the touch panel 3. By using this method, if the finger tip is within the button area of the touch panel 3, the button reacts whichever part of the touch panel 2 is touched thereafter.

As infrared rays are invisible, as long as there are no changes, the user cannot check which position of the touch panel 3 he is touching. For example, if the user increases a touching area by laying down an angle of a touching finger, a coordinate position detected on the touch panel 3 does not necessarily indicate a finger tip. In this case, if the user thinks that the finger tip has been detected, deviation occurs between an actual position of reaction and a reaction position expected by the user, causing an erroneous operation. As a method for solving this problem, a method of displaying a target (e.g., round image or the like about equal in size to the finger tip) on the screen of the coordinate detected on the touch panel 3, and visualizing a touched portion on the touch panel 3 to the user is effective.

Thus, for example, if such deviation occurs, assuming that the finger tip 6 approaches the operation button 8 to be operated, and when the finger tip 6 is shifted from the sensor of the operation button 8 to touch the touch panel 3, display color of a button adjacent to the operation button 8 is changed or not changed. Thus, it can be understood that the finger tip 6 has not correctly pointed the operation button 8.

FIGS. 6A to 6C are views, each showing a second specific example of a change in displaying on the display screen 1 in the process shown in FIGS. 3A to 3C and FIG. 4. Portions corresponding to those shown in FIGS. 5A to 5C are denoted by similar reference numerals.

FIG. 6A shows a display state of the operation button 8 on the display screen 1 while the finger tip 6 is not in a state of touching the touch panel 3, either, as shown in FIG. 3A. In this state, the operation button 8 is displayed in a rectangular shape of initial color, and this displaying is similar to that of FIG. 5A. In this display state, when the finger tip 6 is brought close to the operation button 8, and the finger tip 6 touches the touch panel 3 as shown in FIG. 3B (step 101 of FIG. 4), as shown in FIG. 6B, for example, the shape is changed while the display color of the operation button 8 is maintained. Here, it is assumed that the shape is changed to that of projections formed in both sides of the rectangle (execution of transaction A: step 102 of FIG. 4). Further, when the finger tip 6 touches the touch panel 2 as shown in FIG. 3C (step 105 of FIG. 4), for example, as shown in FIG. 6C, the shape of the operation button 8 returns to the rectangular shape shown in FIG. 6A, and the display color is changed to, for example red (execution of transaction B: step 106 of FIG. 4).

Thus, also in the second specific example, an advantage similar to that of the first specific example shown in FIGS. 5A to 5C is obtained.

FIGS. 7A to 7C are views, each showing a third specific example of a change in displaying on the display screen 1 in the process shown in FIGS. 3A to 3C and FIG. 4. Portions corresponding to those shown in FIGS. 5A to 5C are denoted by similar reference numerals.

FIG. 7A shows a display state of the operation button 8 on the display screen 1 while the finger tip 6 is not in a state of touching the touch panel 3, either, as shown in FIG. 3A. In this state, the operation button 8 is displayed in a rectangular shape of initial color, and this displaying is similar to that of FIG. 5A. In this display state, when the finger tip 6 is brought close to the operation button 8, and the finger tip 6 touches the touch panel 3 as shown in FIG. 3B (step 101 of FIG. 4), as shown in FIG. 7B, for example, a size is changed while the display color of the operation button 8 is maintained. Here, it is assumed that the shape is changed for large displaying (execution of transaction A: step 102 of FIG. 4). Further, when the finger tip 6 touches the touch panel 2 as shown in FIG. 3C (step 105 of FIG. 4), for example, as shown in FIG. 7C, the size of the operation button 8 returns to an original size shown in FIG. 7A, and the display color is changed to, for example red (execution of transaction B: step 106 of FIG. 4).

In order to further assure notification of the touching of the touch panel 2 to the user, when the touch panel 3 is touched, the transaction B may be executed without changing the size of the operation button 8 (i.e., large size is maintained).

Thus, also in the third specific example, an advantage similar to that of the first specific example shown in FIGS. 5A to 5C is obtained.

Figure 8A:
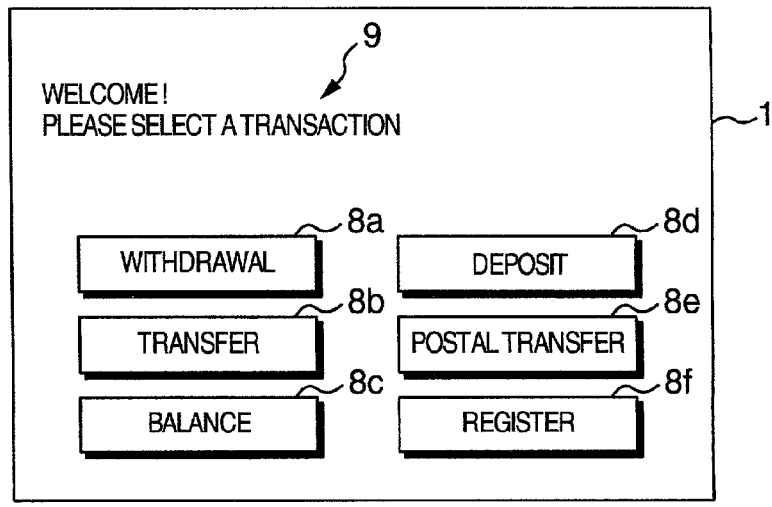
FIGS. 8A to 8C are views, each showing a fourth specific example in displaying on the display screen in the process shown in FIGS. 3A to 3C, and FIG. 4, taking an example of an ATM display screen having the configuration shown in FIGS. 1 and 2.
Figure 8B:
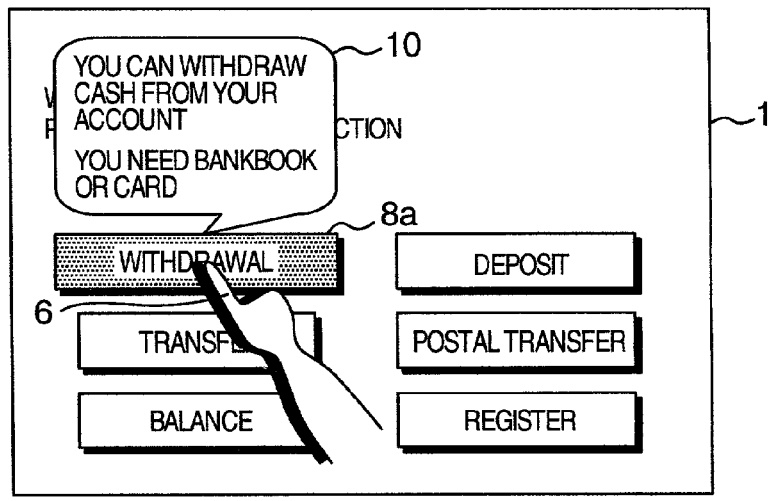
Figure 8C:
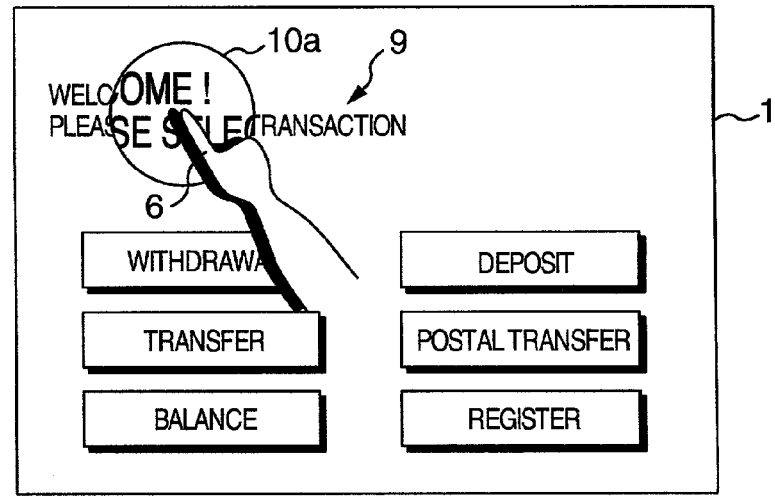

FIGS. 8A to 8C are views, each showing a fourth specific example of a change in displaying on the display screen 1 in the process shown in FIGS. 3A to 3C and FIG. 4, by taking an example of an ATM display screen having the configuration shown in FIGS. 1 and 2. Reference numerals 8a to 8f denote operation buttons, 9 a sentence of guidance, 10 a balloon (balloon help), and 10a an enlarged display area. Portions corresponding to those shown in FIGS. 5A to 5C are denoted by similar reference numerals.

FIG. 8A shows initial menu displaying on the display screen 1. Here, it is assumed that the six operation buttons 8a to 8f and the guidance sentence 9 are displayed. Now, the finger tip 6 is brought close to the operation button 8a of "WITHDRAWAL" among the operation buttons 8a to 8f, and the finger tip 6 touches the touch panel 3 as shown in FIG. 3B (step 101 of FIG. 4), as shown in FIG. 8B, a display state of the operation button 8a is changed (here, for example, display color is changed, but a change may be made as shown in FIG. 6B or 7B). Then, additional information, for example, a content of "CASH CAN BE WITHDRAWN FROM YOUR ACCOUNT. YOU NEED BANKBOOK OR CARD." Or the like is displayed in a balloon 10 (execution of transaction A: step 102 of FIG. 4). In this case, though not shown, when the operation button 8a is touched to set a state of touching the touch panel 2 shown in FIG. 3C (step 105 of FIG. 4), as shown in FIG. 5C, 6C or 7C, red color of the operation button 8a is displayed, indicating that the operation button 8a has been operated (execution of transaction B: step 106 of FIG. 4), and the display state is changed to a screen of "WITHDRAWAL".

Thus, also in this specific example, an advantage similar to each of those shown in FIGS. 5A to 7C is obtained. When the finger tip 6 is released from the touch panel 3 in the display states of FIGS. 8A and 8B (steps 103 and 104 of FIG. 4), the state returns to the original state shown in FIG. 8A.

When the finger tip 6 touches the touch panel 3 on the display portion of the guidance sentence 9 on the display screen 1 of the display state shown in FIG. 8A or 8B, an enlarged display area 10a is set for displaying, in an enlarged manner, a predetermined area around a touching position of the finger tip 6. Accordingly, by moving the finger tip 6 in an arraying direction of a character string of the guidance sentence 9 while its touching of the touch panel 3 is maintained, the guidance sentence 9 can be enlarged and read. In this case, even when the finger tip 6 touches the touch panel 2 as shown in FIG. 3C, its enlarged displaying is continued.

Figure 9:
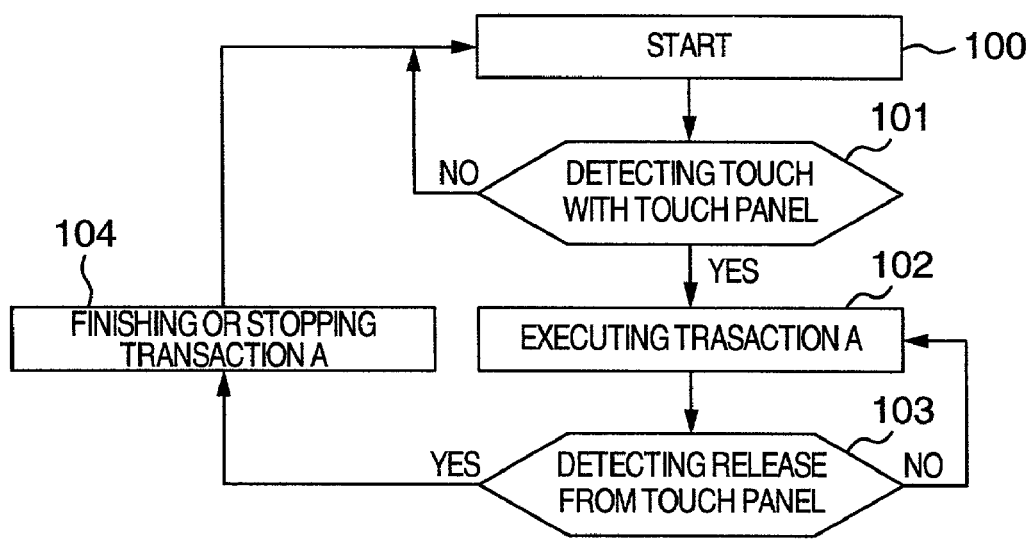
FIG. 9 is a flowchart showing a control process of a display method of the touch responsive display unit of the present invention for displaying on the display screen shown in FIG. 8C, according to another embodiment.

The process shown in FIG. 8C is designed to prevent the touching state of the touch panel 2 by the finger tip 6 from affecting displaying, and the process is shown in FIG. 9. That is, in FIG. 9, when the finger tip 6 touches the touch panel 3 (step 101), irrespective of whether the finger tip 6 is in a state of touching the touch panel 2 or not, as long as the finger tip 6 is in the state of touching the touch panel 3 (step 103), only transaction A (enlarged displaying) is executed.

Thus, on the screen displaying the operation button 8 and the guidance sentence 9, for example on the ATM display screen, the computer 4a (FIG. 2) discriminates the area of the operation button 8 from the other areas, carries out the control process shown in FIG. 4 to execute displaying described above with reference to FIG. 8B when the finger tip 6 touches the touch panel 3 by the operation button 8. When the finger tip 6 touches the touch panel 3 by the guidance sentence 9 or the like other than the operation button 8, the computer 4a carries out the control process shown in FIG. 9 to execute displaying described above with reference to FIG. 8C.

On the display screen 1 for executing the forgoing enlarged displaying, a plurality of touch panels 3 may be provided and, for each touching of one touch panel 3 by the finger tip 6, the enlarged display area 10 may be gradually widened thereby increasing an enlargement rate of a content displayed thereon.

In FIG. 8C, partial enlarged displaying of the guidance sentence 9 is executed. However, all parts of the guidance sentence 9 may be simultaneously enlarged and displayed. In such a case, when a plurality of guidance sentences are simultaneously displayed, the computer 4a (FIG. 2) can identify each guidance sentence, and a guidance sentence touched by the finger tip 6, and this is enlarged and displayed.

For such enlarged displaying, to explain by taking an example of the screen of FIG. 8A, an image signal of a part of the guidance sentence 9 to be enlarged is temporarily stored in a memory. This is then read so as to be enlarged and displayed as in the case of the enlarged display area 10 shown in FIG. 8C, and fitted into the screen shown in FIG. 8A.

Thus, also in this specific example, an advantage similar to each of those of the previous specific examples can be obtained, and a displayed content can be easily seen.

Needless to say, the enlarged displaying of the guidance sentence shown in FIGS. 8A to 8C is not limited to the ATM display.

Figure 10A:
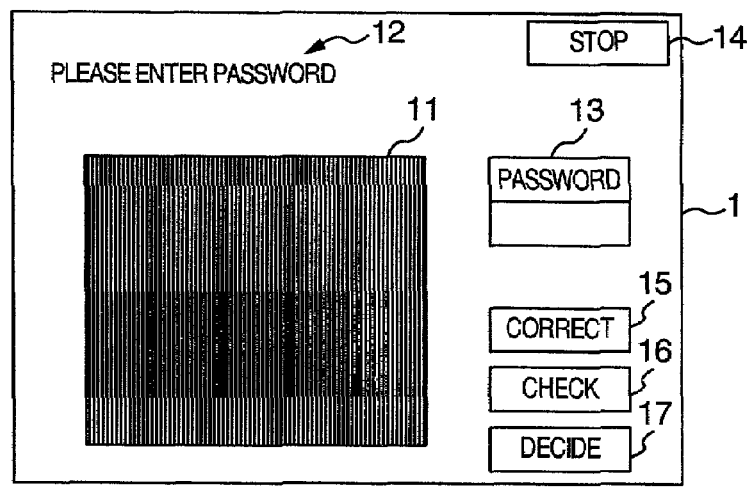
FIGS. 10A to 10C are views, each showing a fifth specific example of a change in displaying on the display screen in the process shown in FIGS. 3A to 3C and FIG. 4, by taking an example of the ATM display screen having the configuration shown in FIGS. 1 and 2.
Figure 10B:
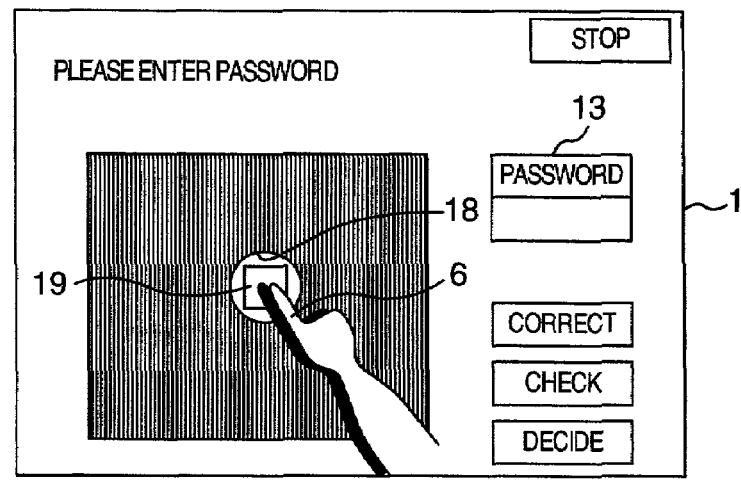
Figure 10C:
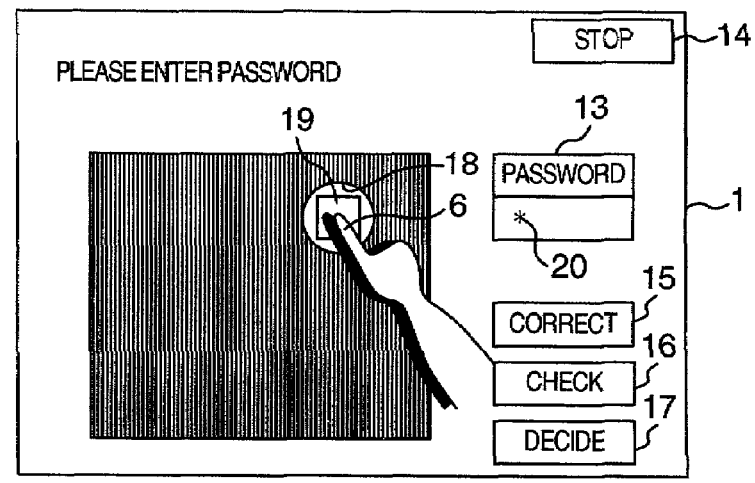

FIGS. 10A to 10C are views, each showing a fifth specific example of a change in displaying on the display screen 1 in the process shown in FIGS. 3A to 3C and FIG. 4, by taking an example of an ATM display screen having the configuration shown in FIGS, 1 and 2. A reference numeral 11 denotes a hiding area, 12 a guidance sentence, 13 a display section of a password, 24 a stop button, 15 a correction button, 16 a checking button, 17 a decision button, 18 an open area, 19 a ten key, and 20 a mark. Portions corresponding to those shown in FIGS. 5A to 5C are denoted by similar reference numerals.

In this specific example, for example, a cash withdrawal screen by the operation of the "WITHDRAWAL" button 8a on the screen operation of FIGS. 8A to 8C is displayed.

FIG. 10A shows initial displaying on the display screen 1. On the display screen 1 of this initial displaying, the hiding area hiding a keyboard composed of the ten key 19, the guidance sentence 12, the password display section 13, and other operation buttons 14 to 17. In this case, nothing is displayed in the password display section 13.

When the finger tip 6 is brought close to the hiding area 11, and touches the touch panel 3 as shown in FIG. 3B (step 101 of FIG. 4), as shown in FIG. 10B, an open area 18 is formed in the area of the hiding area 11, to which the finger tip 6 has approached, and an operation button 8, for example the ten key 109 appears (execution of transaction A: step 102 of FIG. 4). The opening area 18 has a size for completely including one ten key 19. Thus, when the finger tip 6 is moved in its state of touching the touch panel 3, the open area 18 is moved associatively with the finger tip 6. Therefore, a desired ten key 19 can be searched by seeing ten keys 19 one by one.

When the desired ten key 19 is found and, as shown in FIG. 10C, the finger tip 6 is pressed to the display portion of the ten key 19 to set a state of touching the touch panel 2 shown in FIG. 3C (step 105 of FIG. 4), it unit that the ten key 19 has been operated (in this case, display color of the ten key 19 may be changed as in the case of the previous specific examples). A first mark [*] 20 indicating a numeral entry by the ten key 19 is written and displayed on the password display section 13 (execution of transaction B: step 106 of FIG. 4).

By repeating the foregoing operation to operate the desired ten key 19, a password is entered. For example, when a 4-digit password is entered, four marks [*] 20 are displayed side by side on the password display section 13, notifying the entry of the password to the user. Accordingly, when the decision button 17 is operated under confidence that the password has been correctly entered, the entered password is decided, and the process moves to next displaying on the screen. When the finger tip 6 touches the checking button 16, displaying is changed from the displaying of the four marks [*] on the password display section 3 to displaying of an actually entered password, and this can be checked. When the checking button 16 is touched again, or after the passage of a fixed period, the password display section 13 returns to the display state of the four marks [*] 20. If there is an error in the entered password on the password display section 13, for each touching of the correction button 15, such passwords can be erased in the order of new numeral entry. Moreover, by touching the stop button 14, for example, displaying returns to the initial menu screen similar to that shown in FIGS. 8A to 8C.

Accordingly, in this specific example, the keyboard composed of the ten key or the like is hidden on the display screen 1, and the ten keys are visible one by one to the user, who actually carries out a touching operation on the display screen 1. Thus, input information needing security by a password or the like can be made invisible to a third person.

Thus, also in this specific example, for example, for the guidance sentence of "ENTER PASSWORD", enlarged displaying similar to that described above with reference to FIG. 8C (including the foregoing case of gradual enlargement) can be carried out.

Figure 11A:
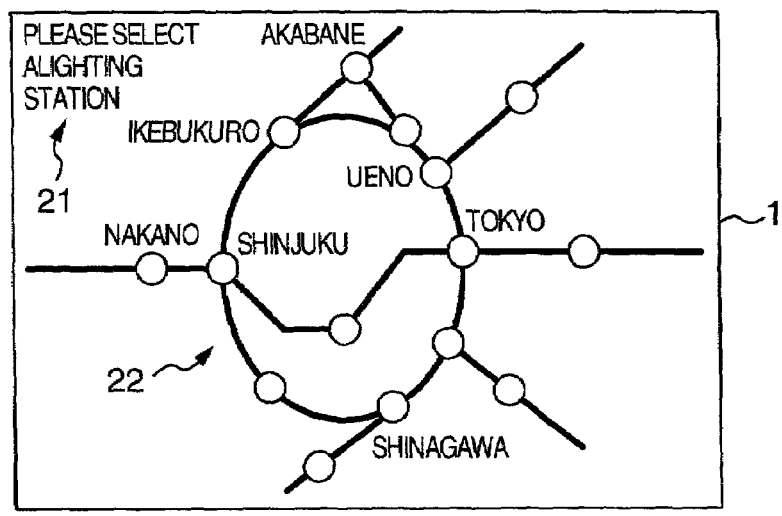
FIGS. 11A to 11C are views, each showing a sixth specific example of a change in displaying on the display screen in the process shown in FIGS. 3A to 3C and FIG. 4, by taking an example of a display screen of a ticket-vending machine having the configuration shown in FIGS. 1 and 2.
Figure 11B:
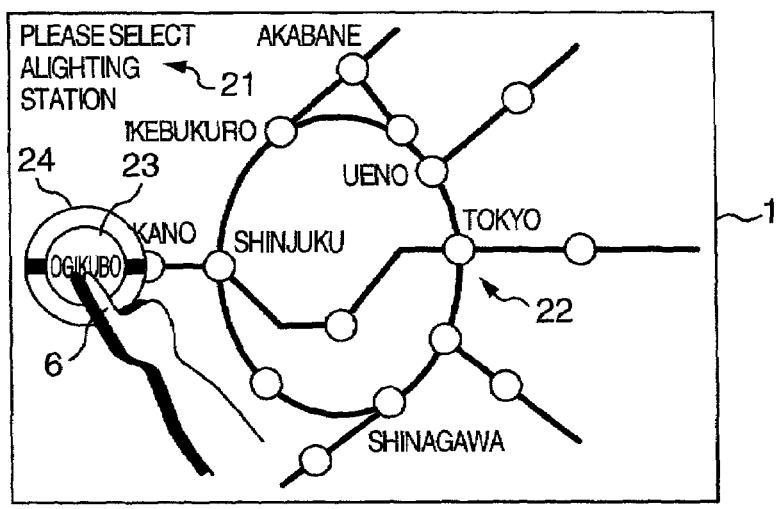
Figure 11C:
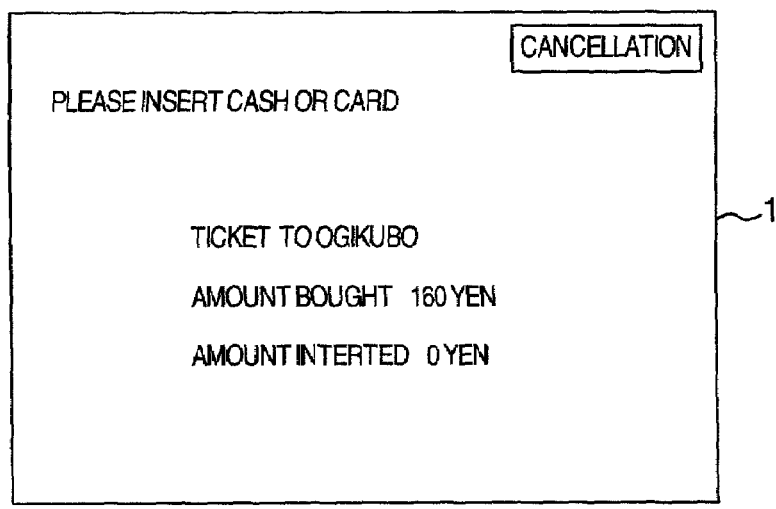

FIGS. 11A to 11C are views, each showing a sixth specific example of a change in displaying on the display screen 1 in the process shown in FIGS. 3A to 3C and FIG. 4, by taking an example of a display screen of a ticket-vending machine having the configuration shown in FIGS, 1 and 2. A reference numeral 21 denotes a guidance sentence, 22 a route map, 23 a mark, and 24 an enlarged display area.

In this specific example, the computer 4a (FIG. 2) has a detailed route map of the same region range, and a schematic route map showing only main stations thereof stored in a built-in memory (not shown in FIG. 2). Normally, as shown in FIG. 11A, as an initial display state, a schematic route map, i.e., a route map of a ticket-vending range showing main stations and a guidance sentence 21, on the display screen 1. For each of the main stations, a mark [○] is displayed in a position on the route map, and a station name is written thereon. The mark [○] indicates an operation button for buying a ticket to the written station. Some station names and marks [○] thereof between the marks [○] on the route are omitted.

Apparently, a customer (user) knows such a route map to a certain extent, and accordingly the user knows a place of a desired station even if it is omitted. Thus, when buying a ticket to Ogikubo Station, the user knows that this station is located on the left from Nakano Station. As shown in FIG. 11B, the finger tip 6 is brought close to the route on the left side from Nakano Station. When the finger tip 6 touches the touch panel 3 (step 101 of FIG. 4) as shown in FIG. 3B, an enlarged display area 24 for displaying a mark [○] 23 on the station name "OGIKUBO" in an enlarged manner is displayed in a position pointed by the finger tip 6 (execution of transaction A: step 102 of FIG. 4).

Thus, when this mark [○] 23 is touched to set a state of touching the touch panel 2 shown in FIG. 3C by the finger tip 6 (step 105 of FIG. 4), as shown in FIG. 11C, a guidance screen notifying an amount of money of the ticket to Ogikubo Station or the like is displayed 6C or 7C, red color of the operation button 8a is displayed (execution of transaction B: step 106 of FIG. 4). When this mark [○] 23 is touched, as in the case of the specific examples shown in FIGS. 5A to 7C to FIGS. 7A–7C, the process may be moved to the guidance screen shown in FIG. 11C after display color is changed to another.

Thus, in this specific example, as an initial screen, a screen showing a schematic information content similar to that shown in FIG. 11A is displayed. Then, as shown in FIG. 3B, by touching the touch panel 3 with the finger tip 6, detailed information can be displayed from this screen. Accordingly, when an amount of information is large, and displayed on the screen, if much information is minutely displayed, being difficult to be seen, the screen of the schematic information only needs to be displayed. Here, the ticket-vending machine is taken as an example. However, a terminal device for handling such information screen is not limited to such, and this specific example can be applied to such a terminal device.

In this specific example, on the route map 22 shown in FIG. 11A, for example for a mark [○] of a clearly specified station, Shinjuku Station or the like, even if a touching state similar to that shown in FIG. 3B is set, needless to say, the specified station is enlarged and displayed as shown in FIG. 11B. However, without enlarged displaying, a state may be changed to a guidance screen shown in FIG. 11C while a display state shown in FIG. 11A is maintained (color may be changed).

In addition, in FIG. 11B, when the finger tip 6 is moved along the route, the enlarged display area 24 is associatively moved, sequentially displaying marks [○] showing similar station names of next stations.

FIGS. 12A to 12C and FIGS. 13A to 13C are views, each showing a seventh specific example of a change in displaying on the display screen 1, by taking an example of a digital content deliver terminal device having the configuration shown in FIGS. 1 and 2. Reference numerals 25a to 25i denote icons, 26a to 26e operation buttons, 27 a screen, and 27a and 27b operation buttons.

Figure 14:
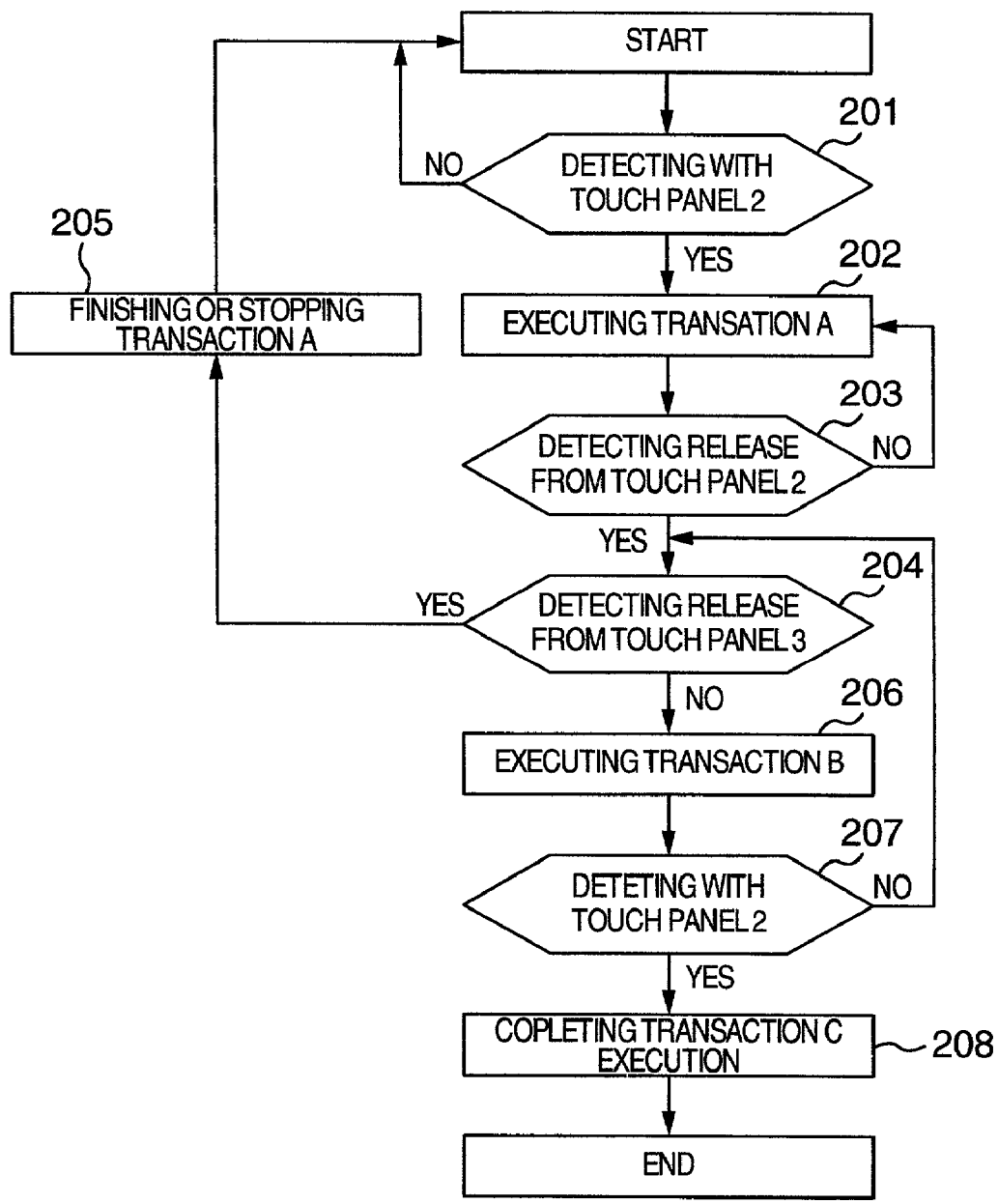
FIG. 14 is a flowchart showing a control process of a display method of the touch responsive display unit of the present invention for displaying shown in FIGS. 12A to 12C and FIGS. 13A to 13C, according to yet another embodiment.

FIG. 14 is a flowchart showing a control process of the computer 4a (FIG. 2) for changing displaying. Also in this case, touching states of the touch panels 2 and 3 by the finger tip 6 are shown in FIGS. 3A to 3C.

Figure 12A:
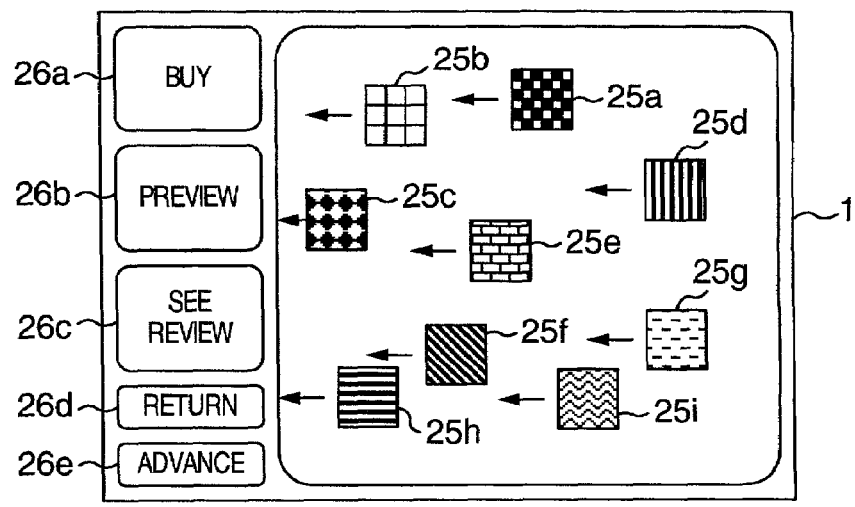
FIGS. 12A to 12C are views, each showing a seventh specific example of a change in displaying on the display screen, by taking an example of a display screen of a digital content delivery terminal device having the configuration shown in FIGS. 1 and 2.

As shown in FIG. 12A, in this specific example, as initial screen, operation buttons for selecting a digital content delivering method, for example a "BUY" area 26a, a "PREVIEW" area 26b, and a "SEE REVIEW" area 26c, are set, and also various icons 25a to 15i are displayed. These icons 25a to 25i may be scrolled in a left direction. Accordingly, much more icons can be displayed. A "RETURN" button 26d is for returning to a screen one before. A "ADVANCE" button 26e is for advancing to a next screen.

Next, an operation of this specific example will be described by referring to FIG. 14.

Figure 12B:
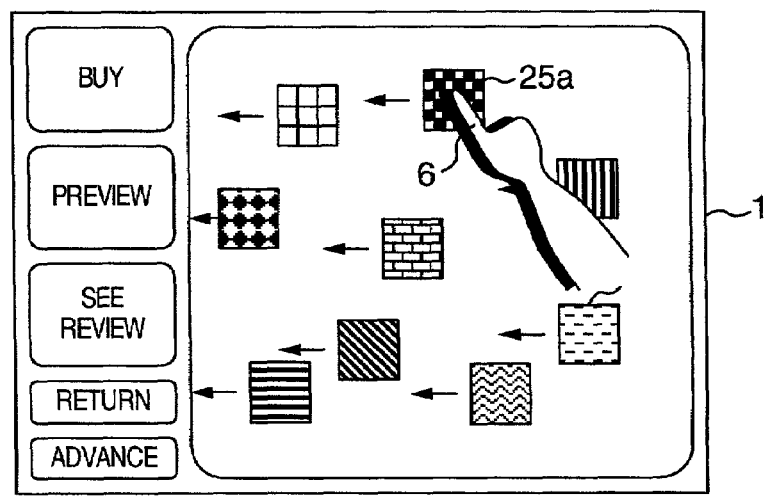
Figure 12C:
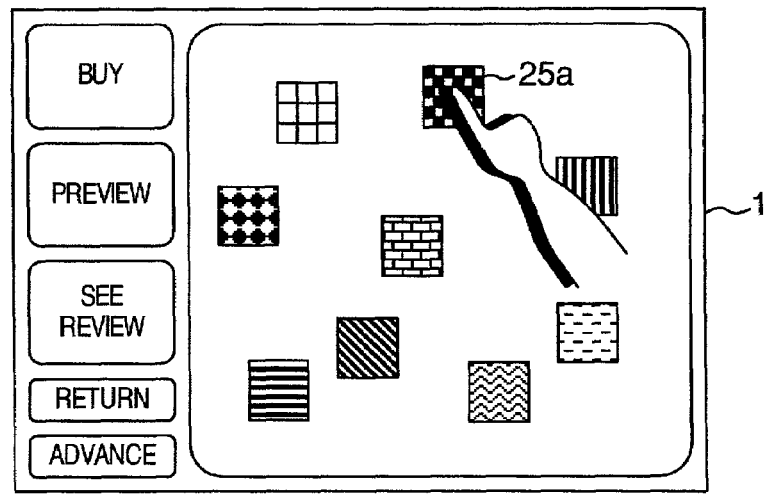
Figure 13A:
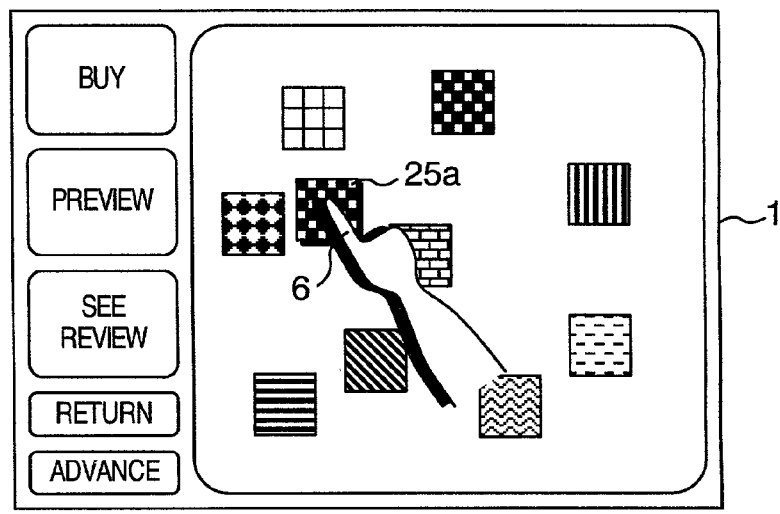
FIGS. 13A to 13C are views, each showing a subsequent change in displaying on the display screen of FIGS. 12A to 12C.

It is now assumed that the icon 25a is pasted to the "BUY" button 26a, as shown in FIG. 12B, the finger tip 6 is brought close to the icon 25a being scrolled to be set in a state of touching the touch panel 3 as shown in FIG. 3B. In this state, however, no changes occur in displaying on the display screen 1. Here, if necessary, by displaying the icon in an enlarged or balloon manner, information easier to be understood may be supplied to the user. Then, the finger tip 6 is pressed to the icon 25a of the screen, and the finger tip 6 touched the touch panel 2 as shown in FIG. 3C (step 201 of FIG. 14). Then, as shown in FIG. 12C, scrolling of all the icons is stopped (execution of transaction A: step 202 of FIG. 14). Then, the finger tip 6 is released from its touching of the screen (state of the finger tip 6 touching the touch panel 2 shown in FIG. 3C) (step 203 of FIG. 14), and the finger tip 6 is set in a state of touching the touch panel 3 as shown in FIG. 3B (step 204 of FIG. 14). Accordingly, as shown in FIG. 13A, the icon 25 is shadowed, thereby being seen in a state of sticking to the finger tip 6. Associatively with the movement of the finger tip 6, the icon is moved by being stuck to the finger tip 6 (execution of transaction B: step 206 of FIG. 14). When the finger tip 6 is released from the touch panel 3 in this state, the foregoing processing is finished or stopped, and the process returns to an original state shown in FIG. 12A (step 205 of FIG. 14).

Figure 13B:
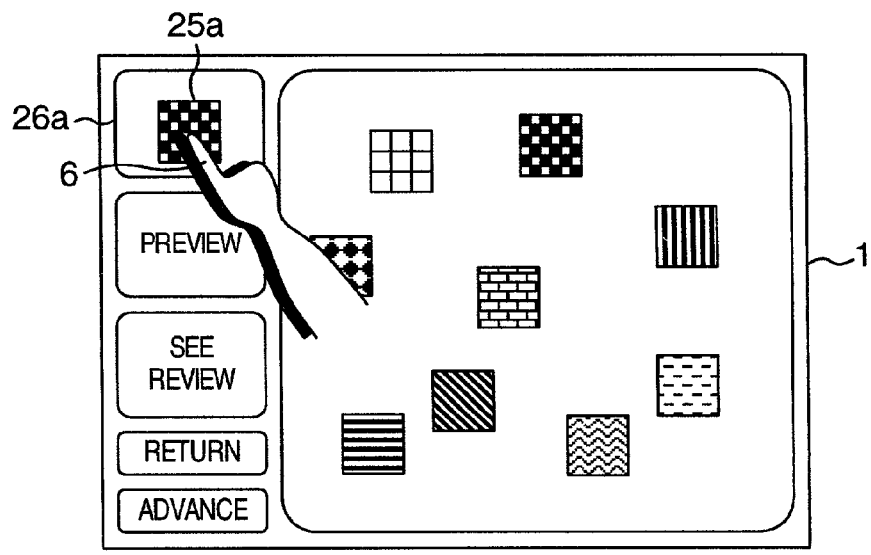

When the icon 25a is moved in step 206 of FIG. 14, as shown in FIG. 13B, it is positioned to the target "BUY" button 26a, and a portion of the "BUY" button 26A is touched by the finger tip 6 (state of the finger tip 6 touching the touch panel 2 shown in FIG. 3C) (step 207 of FIG. 14), the icon 25a is pasted to the position of the "BUY" button 26a (execution of transaction C: step 208 of FIG. 14).

Figure 13C:
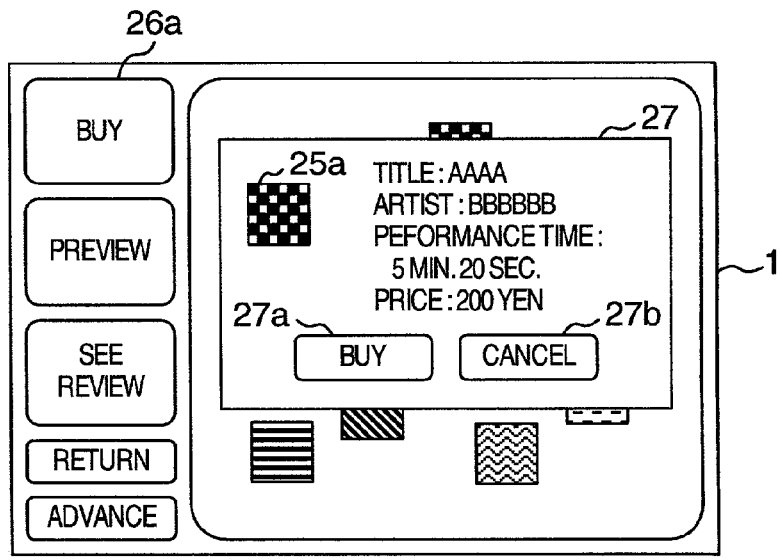

When the "BUY" button 26a having the icon 25a pasted is touched by the finger tip 6 (in this case, immediately after touching, the finger tip 6 is simultaneously released from the touch panels 2 and 3: steps 203 to 205 of FIG. 14), the "BUY" button 26a functions and, as shown in FIG. 13C, for example, a buy screen 27 showing information regarding a music content to be bought is displayed (on this buy screen 27, the icon 25a pasted to the "buy" button 26a is displayed). By touching and operating the "BUY" button 27a, its content can be delivered with charge. By touching and operating the "cancel" button 27b, information regarding a next content to be bought is displayed. When there is not the next content, the displaying of the buy screen 27 can be erased.

The method of pasting the icon to the buy button and then depressing the buy button to assure the operation has been described. When a quicker operation is requested, however, the icon may be caused to appear immediately after it is pasted to the buy button.

Thus, a desired icon can be selected, and pasted to a predetermined position. The pasted icon can be returned to an original scrolling position by a similar operation of the finger tip 6. Moreover, when the finger tip 6 is released (released from the touch panel 3) during the movement of the icon, the icon returns to an original position before the movement (steps 204 and 205 of FIG. 14).

In a situation where a change in an icon position is a problem, in step 206 of FIG. 14, the icon may be copied, and icon displaying may also be left in an original position separately from the icon moved being stuck to the finger tip 6.

Needless to say, the specific example of moving the icon by the finger tip and pasting it to the predetermined position is not limited to the digital content delivery terminal, but it can be applied to an optional terminal using icons.

Figure 15A:
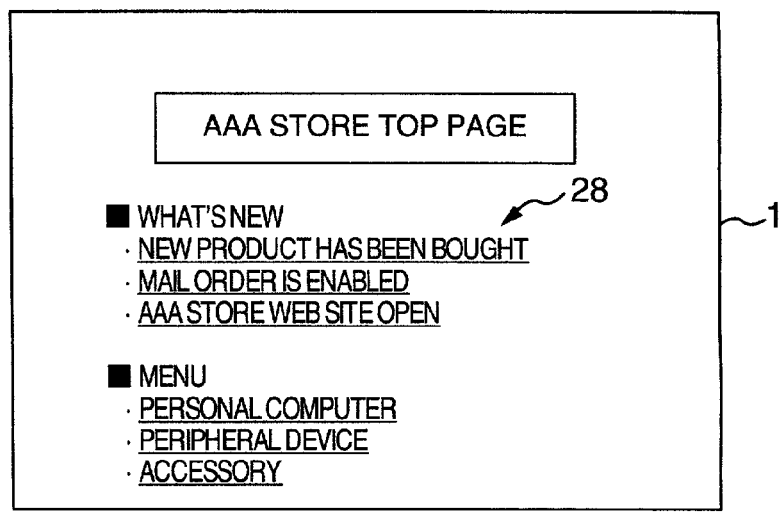
FIGS. 15A to 15C are views, each showing an eighth specific example in displaying on the display screen in the process shown in FIGS. 3A to 3C and FIG. 4, by taking an example of a display screen of a web browsing machine having the configuration shown in FIGS. 1 and 2.
Figure 15B:
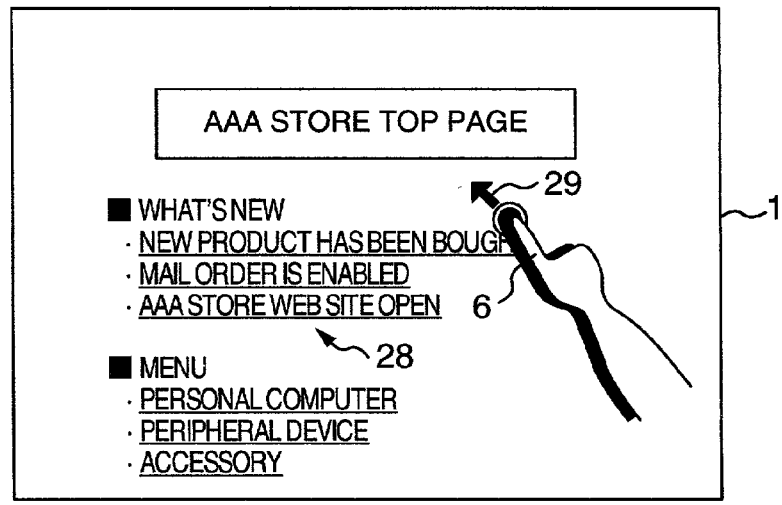
Figure 15C:

FIGS. 15A to 15C are views, each showing an eighth specific example of a change in displaying on the display screen 1 in the process shown in FIGS. 3A to 3C and FIG. 4, by taking an example of a display screen of a web browsing machine having the configuration shown in FIGS. 1 and 2. A reference numeral 28 denotes a content, and 29 a pointer.

When a web content is obtained through Internet, as shown in FIG. 15A, its content 28 is displayed on the screen displaying the content. However, when there are other contents linked with the content 28, a part of the content is displayed by being colored or the like (here, indicated by underline) and, by clicking this part, the linked content is prevented from being obtained.

In this specific example, as shown in FIG. 15B, when the finger tip 6 is brought close to the display screen 1, and set in a state of touching the touch panel 3 as shown in FIG. 3B (step 101 of FIG. 4), a pointer 29 having an arrow is displayed on the finger tip 6. When the finger tip 6 shown in FIG. 3B is set in a state of touching the touch panel 3, and moved, the pointer 29 is also moved by being stuck to the same. Thus, as shown in FIG. 15C, it can be moved to the linked portion of the displayed content 28 (execution of transaction A: step 102 of FIG. 4). Then, when the finger tip 6 is pressed to the screen while the linked portion is indicated by the arrow of the pointer 29 (finger tip 6 is set in a state of touching the touch panel 2 by an arrow base portion of the pointer 29: step 105 of FIG. 4), delivery of the linked content is requested (execution of transaction B: step 106 of FIG. 4).

Thus, by using the pointer, touching and operating of a very small portion difficult to be touched by the finger tip are facilitated. Needless to say, this specific example is not limited to the web browsing machine, but it can be used for a screen of an optional terminal device.

Figure 16A:
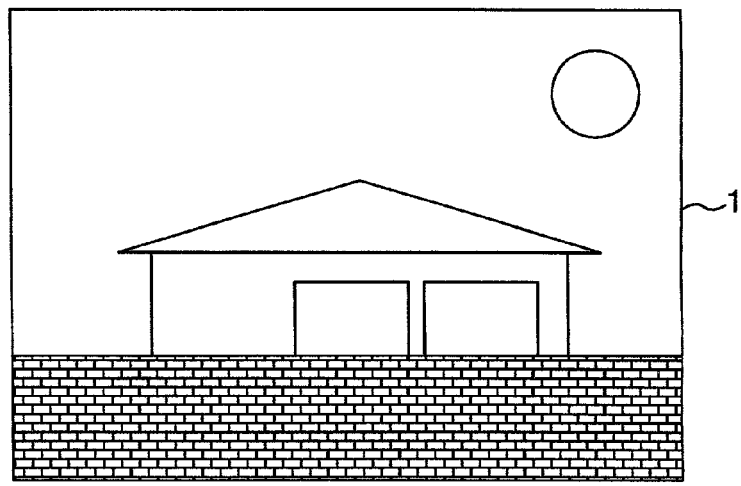
FIGS. 16A to 16C are views, each showing a ninth specific example of a change in displaying on the display screen based on a control process shown in FIGS. 3A to 3C and FIG. 4, by taking an example of a display screen of a video reproducing terminal device having the configuration shown in FIGS. 1 and 2.
Figure 16B:
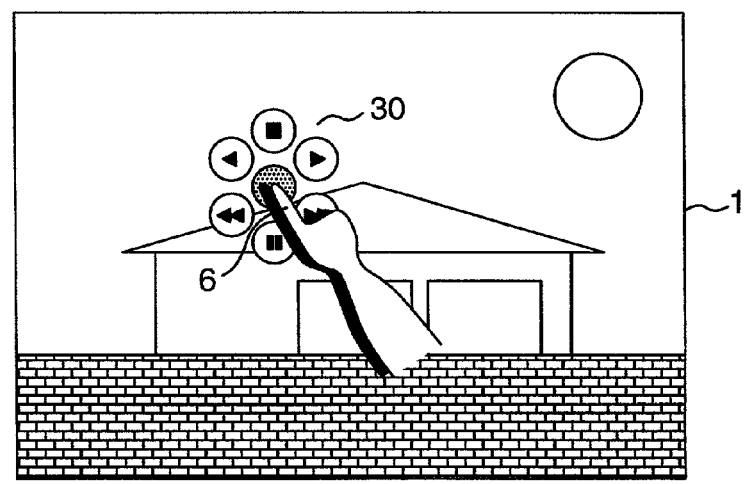
Figure 16C:
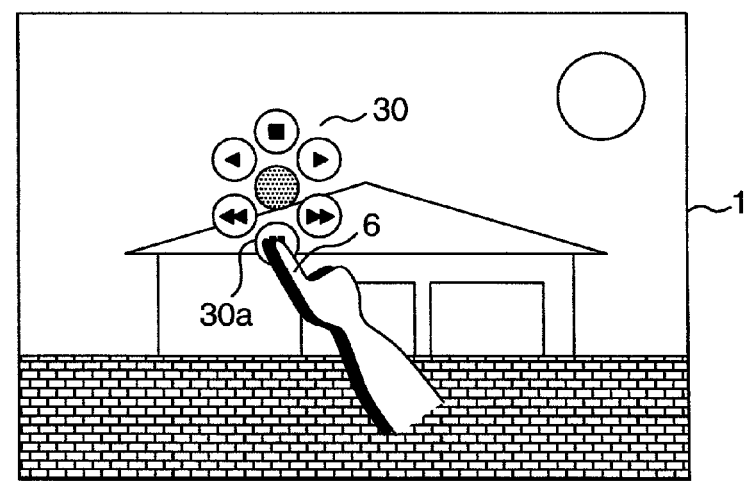

FIGS. 16A to 16C are views, each showing a ninth specific example of a change in displaying on the display screen 1 based on the control process shown in FIGS. 3A to 3C and FIG. 4, by taking an example of a display screen of a video reproducing terminal device having the configuration shown in FIGS. 1 and 2. A reference numeral 30 denotes an operation screen, and 30a an operation button.

The video reproducing terminal of this specific example includes functions of reproducing, fast-forwarding, and rewinding video information such as a moving image down-loaded from a server.

It is now assumed that predetermined video information has been down-loaded. When power is turned ON, as shown in FIG. 16A, the display screen 1 is in an initial state displaying wall paper of, for example a landscape. In this state, the finger tip 6 is brought close to an optional position on the display screen 1, and when the finger tip 6 touches the touch panel 3 as shown in FIG. 3B (step 101 of FIG. 4), as shown in FIG. 16B, an operation screen 30 having operation buttons disposed in a flower petal shape at a place on the display screen 1 indicated by the finger tip 6 (execution of transaction A: step 102 of FIG. 4). Accordingly, as shown in FIG. 16C, when one predetermined operation button 30a on the operation screen 30 is touched and operated (i.e., finger tip 6 touches the touch panel 2 by the finger tip 6 on the display portion of the operation button 30a: step 105 of FIG. 4), a function for the operation button 30a is executed (execution of transaction B: step 106 of FIG. 4).

Thus, the operation screen not displayed on the initial screen is displayed in a position indicated by the finger tip 6, enabling a desired operation to be executed. The example of the operation screen of the video reproducing terminal device has been described. However, a menu screen or a guidance screen of an optional terminal device may be used. Also, in this case, the disposition of the displayed buttons may be a pull-down menu type other than the flower petal shape.

Figure 17A:
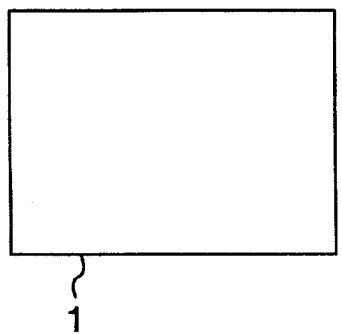
FIGS. 17A to 17C are views, each showing a tenth specific example of a change in displaying on the display screen based on the control process shown in FIGS. 3A to 3C and FIG. 4, by taking an example of a display screen of a terminal having the configuration shown in FIGS. 1 and 2.
Figure 17B:
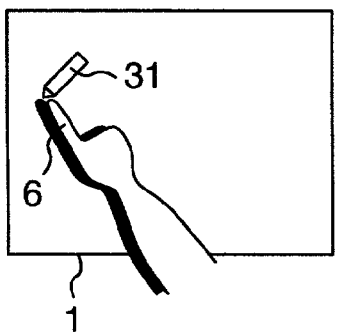
Figure 17C:
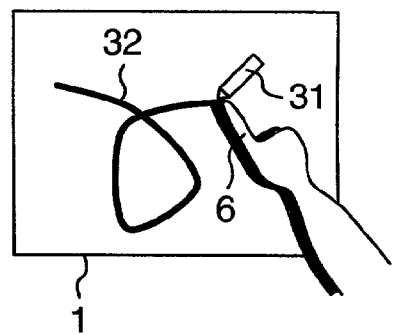

FIGS. 17A to 17C are views, each showing a tenth specific example of a change in displaying on the display screen 1 based on the control process shown in FIGS. 3A to 3C and FIG. 4, by taking an example of a display screen 1 of a terminal device having the configuration shown in FIGS, 1 and 2. A reference numeral 31 denotes a pen, and 32 a track.

This specific example enables a track to be drawn on the display screen 1 following a movement of the finger tip.

As shown in FIG. 17A, the finger tip 6 is brought close to the plain display screen 1, and when the finger tip 6 touches the touch panel 3 as shown in FIG. 3B (step 101 of FIG. 4), as shown in FIG. 17B, the pen 31 is displayed on the finger tip 6. Then, when the finger tip 6 is moved in the state of touching the touch panel 3, as shown in FIG. 17C, the pen 31 is moved associatively with the finger tip 6 to draw its track 32 (execution of transaction A: step 102 of FIG. 4). When the finger tip 6 touches the screen after the drawing of the desired track 32 (i.e., as shown in FIG. 3C, the finger tip 6 touches the touch panel 2: step 105 of FIG. 4), the track 32 is directly left on the display screen (execution of transaction B: step 106 of FIG. 4).

Thus, in this specific example, an image of illustration or a character can be written by hand. In this case, because of displaying of the pen 31, the image looks as if being drawn by a tip of the pen 31, enabling a very small image to be drawn.

FIGS. 18A to 18E are views, each showing an eleventh specific example of a change in displaying on the display screen 1 based on the control process shown in FIGS. 3A to 3C and FIG. 4, by taking an example of a display screen 1 of a terminal having the configuration shown in FIGS, 1 and 2. A reference numeral 33 denotes a ripple, and 34 a hand.

This specific example enables a warning to be issued when two or more places on the display screen 1 are simultaneously touched.

Figure 18A:
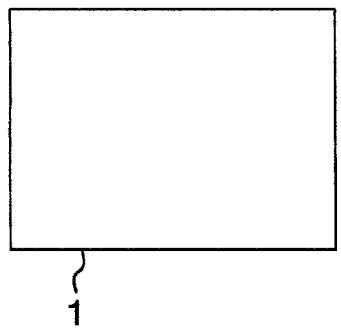
FIGS. 18A to 18E are views, each showing an eleventh specific example of a change in displaying on the display screen based on the control process shown in FIGS. 3A to 3C and FIG. 4, by taking an example of a display screen of a terminal having the configuration shown in FIGS. 1 and 2.
Figure 18B:
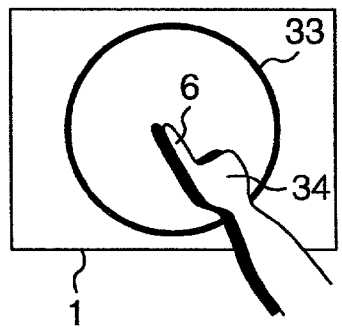
Figure 18C:
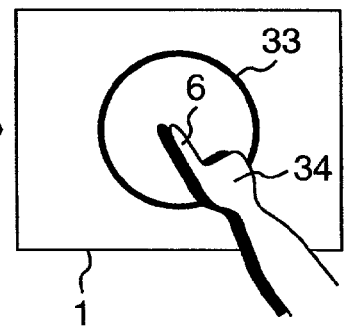
Figure 18D:
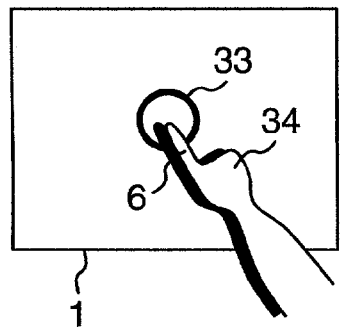
Figure 18E:
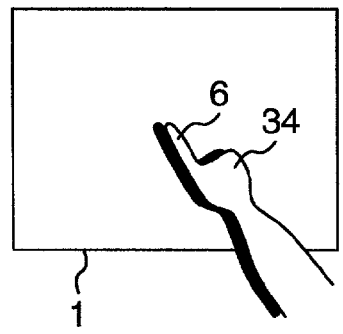

When the finger tip 6 is brought close to an initial screen of the display screen 1 shown in FIG. 18A, and an operation button, not shown, is touched and operated, the finger tip 6 and a part of the hand 34 other than this may simultaneously touch the touch panel 3 (FIG. 3B). In this case, the computer 4a (FIG. 2) fetches information of each touching position. However, the computer 4a cannot be determined which is a correct touching position. In such a case, the computer 4a sends warning information to the display unit 1 (FIG. 1), and then causes a ripple 33 for warning to be drawn on the display screen 1 as shown in FIG. 18B. As shown in FIGS. 18B to 18D, the ripple 33 becomes large and small, giving visual warning to the user. In this case, warning may be issued simultaneously with a voice. When the user notices this and releases the hand 34 from the screen, or a part other than the finger tip 6 of the hand 34 from the screen, setting a state shown in FIG. 3B, the ripple 33 disappears from the display screen 1.

When a touching operation is carried out by the finger tip, two or more touching portions are often generated. In the embodiment, however, since visual warning is issued regarding an incorrect operation state, a correct touching operation can be carried out, thereby preventing erroneous operations.

This specific example can be applied to an optional terminal device executing touching operations. Moreover, the circular ripple 33 was shown. The ripple is not limited to such, and a shape is optional.

The methods of causing various screen changes by using the touch panel 3 have been described. In all of these methods, by adding proper sound effects following screen changes, understanding by the user can be facilitated more. For example, following a button shape change when the touch panel 3 is touched, warning sound may be generated, a button content may be read by voice, or a sound related to the button content may be generated (e.g., if a content of a screen, to which change is made by depressing the button, a wave sound is generated).

As described above, according to the embodiment, the touch responsive display unit includes the second touch panel disposed on a display screen, the first touch panel disposed on the second touch panel, the first position detecting unit for detecting a touching position of an indicator on the first touch panel when the indicator designates a predetermined position on the display screen, the second position detecting unit for detecting a touching position of the indicator on the second touch panel when the indicator designates the predetermined position on the display screen, and the control unit for executing first transaction according to a detection result of the first position detecting unit, setting a display state on the display screen to a first display state according to the touching position of the indicator on the first touch panel detected by the first position detecting unit, executing second transaction according to a detection result of the second position detecting unit, and setting a display state on the display screen to a second display state according to the touching position of the indicator on the second touch panel detected by the second position detecting unit. Thus, a display state can be changed according to a state of a touching operation on the display screen, and an operation target on the display screen can be easily recognized based on the state of the touching operation.

When the operation target is an operation button, touching of the first touch panel causes a change in the display state (becoming a first display state). Thus, checking can be easily made on whether an error is present or not in the operation button touch-operated in this stage. By touching the second touch panel from this first display state, the display state is changed to the second display state. Thus, the target operation button can be operated without any mistakes.

The plurality of operation buttons are displayed on the display screen, the touching positions of the indicator are in positions on the first and second touch panels of the indicator designating the respective operation buttons, and the first display state displays information regarding the operation buttons designated by the indicator according to the detection result of the first position detecting unit. Thus, even if the respective functions of the plurality of operation buttons cannot be determined, and the other operation button is touched and operated by mistake, before it is operated, the erroneous operation of the operation button can be notified based on the display information, enabling erroneous operations.

The area for displaying character or other messages is set on the display screen, and the control unit displays a part or all parts of the area in an enlarged manner when at least the first position detecting unit detects a touching position corresponding to the area. Thus, the messages become easier to be seen and read, and screen guidance or the like can be accurately notified to the user.

The hiding area for hiding a predetermined image is set on the display screen, and the first display state opens an area of a predetermined size including an indication point by the indicator in the hiding area according to the detection result of the first position detecting unit, and displays a part of the hidden predetermined image from the open area and, in this case, the predetermined image is a key board including at least the ten key. Thus, when information needing security by a password or the like is entered, it is prevented from being noticed by the third person.

The detailed image, and the schematic image indicating only a main portion of the detailed image are provided, the schematic image is displayed on the display screen, and the first display state displays the detailed image at an indication point by the indicator in the schematic image according to the detection result of the first position detecting unit. Thus, the entire content can be easily understood from the schematic screen, and the detailed content can also be obtained by a simple operation.

The plurality of icons are displayed on the display screen, the first display state enables the icons designated by the indicator to be moved associatively with a movement of the indicator according to the detection result of the first position detecting unit, and the second display unit fixes positions of the icons designated by the indicator according to the detection result of the second position detecting unit. Thus, by a manual operation, a desired icon can be selected, and pasted to a predetermined position, simplifying the icon pasting work.

The first display state displays a pointer at an indication point by the indicator according to the detection result of the first position detecting unit, and the second display state designates and decides an indication point by the pointer. Thus, even a very small portion difficult to be touched by the finger tip can be easily touched and operated.

The first display state displays an image of an operation panel in a position designated by the indicator on the display screen according to the detection result of the first position detecting unit. Thus, the operation screen can be displayed in an optional position on the display screen, facilitating the operation.

The fist display state displays an image of a pen in the position designated by the indicator on the display screen, moves the pen associatively with a movement of the indicator, and displays a moving track of the pen, according to the detection result of the first position detecting unit, and the second display state decides displaying of the track of the pen. Thus, an image of illustration or a character can be handwritten on the display screen and, in this case, since the pen is drawn and displayed, the image looks as if it is drawn by the tip of the pen, making it possible to accurately draw a very small image.

The control unit displays a warning image on the display screen as the first display state when the first position detecting unit detects two or more touching positions on the first touch panel. Thus, in the case of a touching operation by the finger tip, even when two or more touching portions are generated, visual warning is issued recognizing an incorrect operation state, facilitating the operation by a correct touching method to prevent erroneous operations.

As described above, according to the present invention, recognition as to a display content of an operation button or the like to be operated is easy, facilitating the operation to enhance operability.

Figure 19:
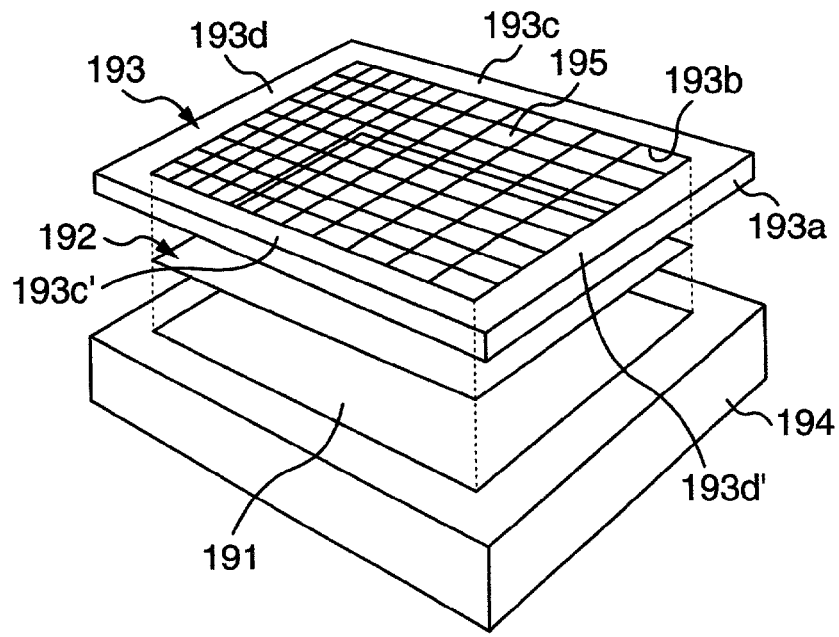
FIG. 19 is a perspective view schematically showing a configuration of a touch responsive display according to an embodiment of the present invention.
Figure 20A:
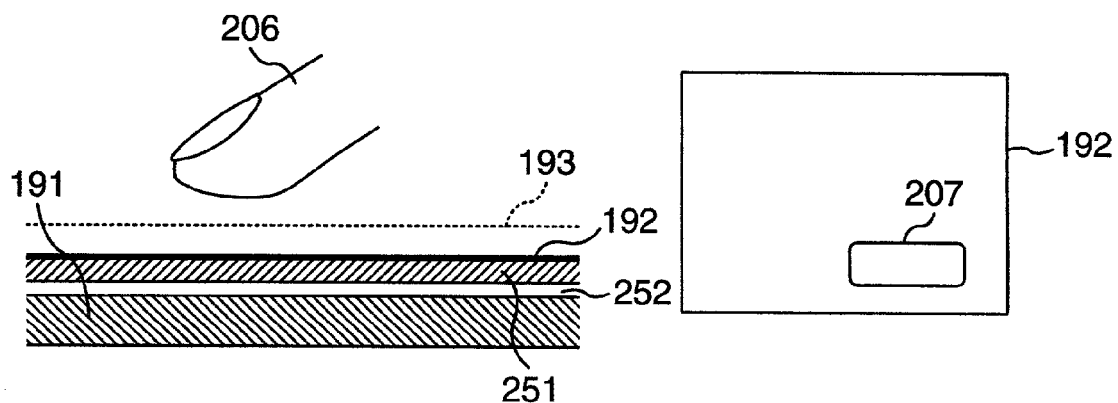
FIGS. 20A to 20C are views, each schematically showing an operation state by a user on the touch responsive display, and a corresponding display state on a display screen.
Figure 20B:
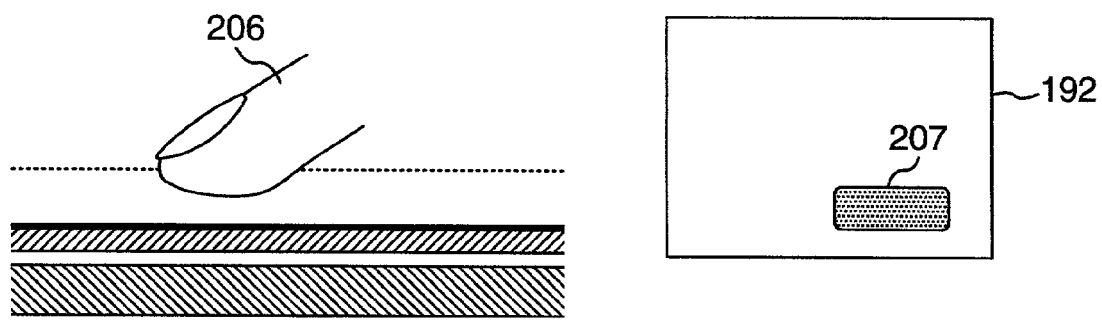
Figure 20C:
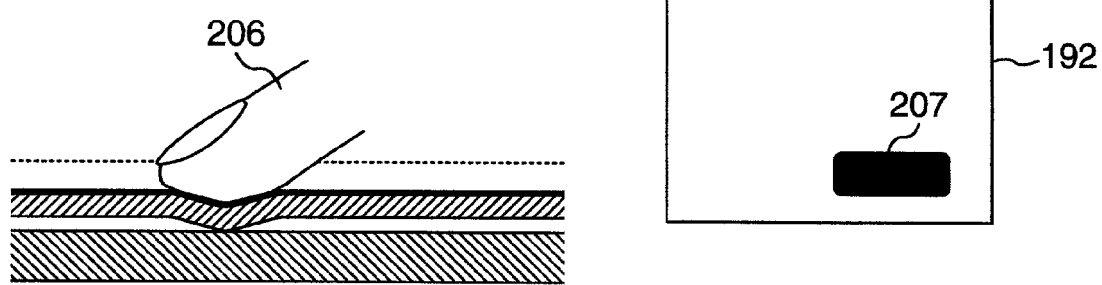

Next, the other preferred embodiments of the present invention will be described. FIG. 19 is a perspective view schematically showing a configuration of the embodiment. A reference numeral 192 denotes a display screen, 191 and 193 touch panels, 193a a frame, 193b a hollow portion, 193c, 193c', 193d and 193d' edges, 194 a control unit, and 195 infrared rays. In FIGS. 20A to 20C, a reference numeral 251 denote a cushion material, and 252 a gap.

In FIG. 19, in the embodiment, the display unit 192 is provided integrally with the control unit 194. It is a flexible paper (sheet), in which a portion receiving pressing is bent (distorted). The touch panel 191 of a pressing type is installed on the lower portion of the display unit 192, and another touch panel 193 of infrared rays is provided thereon. For the display unit 192, for example, one formed by a well-known technology for mixing an ink capsule having a potential into a sheet material, and capable of displaying by applying a potential is used.

The touch panel 193 has the frame 193a, and a size of the hollow portion 193b inside the frame 193a is set substantially equal to that of the display screen 191. On the hollow portion 193b of the frame 193a, thin beam-shaped infrared rays 195 are radiated vertically from an inner surface of one edge 193c of the frame 193a in a horizontal direction. These infrared rays are detected by a sensor (not shown) provided in an inner surface of the other edge 193c' opposite the edge 193c. Similarly, thin beam-shaped infrared rays 195 are radiated vertically from an inner surface of one edge 193d of the frame 193a in a longitudinal direction. These infrared rays are detected by a sensor (not shown) provided in an inner surface of the other edge 193d' opposite the edge 193d. That is, on the hollow portion 193b of the frame 193a, an infrared ray film is formed, in which many beams of infrared rays 195 are radiated intersecting one another in the horizontal and longitudinal directions. This infrared ray film is laid above the display screen 191, e.g., on a portion of several 10 mm.

When a finger (not shown) is inserted into the hollow portion 193b of the frame 193, the horizontal and longitudinal beams of infrared rays 195 are blocked in its insertion position. By detecting this blocking based on outputs of the sensors provided in the edges 193c' and 193d', the control unit 194 detects the finger insertion position in the hollow portion 193b.

The touch panel 191 detects distortion of its touching position when a finger tip touches the display screen 192. For example, a resistive type is used for detecting the distortion of the display screen 192.

Further, in the embodiment, the cushion material 251 is disposed below the display screen 192. This cushion material 251 is disposed adjacently to the lower surface of the display screen 192 to stably support the display screen 192, thereby reducing distortion during normal time. Moreover, since the cushion material 251 is disposed between the display screen 192 and the touch panel 191, a state of touching the touch panel 191 can be set by not only touching the display screen 192 but also pushing in the display screen 192, a feel of operating the operation key can be given to the user. In the embodiment, to give such a feel to the user, a gap is provided between the cushion material 251 and the touch panel 191 to set a deep pushing-in stroke. Thus, the distortion of the display screen 192 can be properly detected, and a clicking feel of each key can be given to the user.

The cushion material 251 and the touch panel 191 may be disposed by being changed in position. In this case, sensitivity of the touch panel 191 is preferably set low.

As such touch panels 192 and 193 are provided on the display screen 192, a finger tip is inserted into the hollow portion 193b of the touch panel 193. Two states can be selected, i.e., a state of not touching the display screen 192 or having no distortion of the screen even if it is touched (referred to a state of touching the touch panel 193, hereinafter), and a state of a finger tip touching the display screen 192 through the hollow portion 193b of the touch panel 193, and detecting the distortion on the touch panel 191 (referred to a state of touching the touch panel 191, hereinafter). Here, these states are set by different operations on the display screen 192. That is, the state of touching the touch panel 193 is set by a touching operation of the touch panel 193. The state of touching the touch panel 192 is set by a touching operation of the touch panel 191.

In the embodiment, the touch panel 193 is an infrared-ray type. However, the touch panel is not limited to such, and for example, a resistive type, a capacitive type, a surface wave type or the like may be used.

Figure 21:
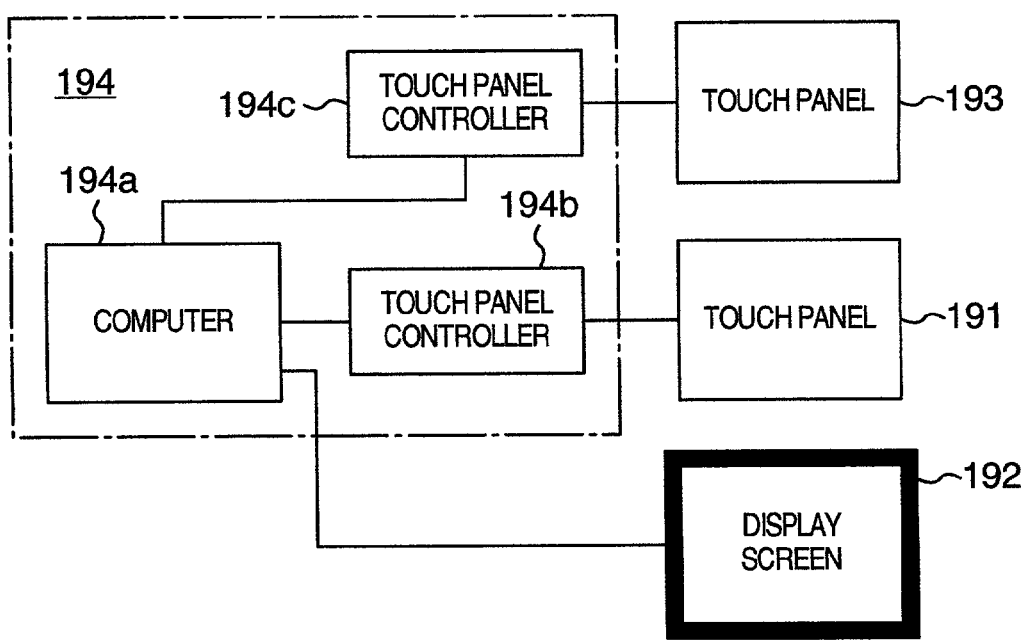
FIG. 21 is a block diagram showing a system configuration of the touch responsive display shown in FIG. 19.

FIG. 21 is a block diagram showing a system configuration of the touch responsive display unit shown in FIG. 19. A reference numeral 194a denotes a computer, and 194b and 194c touch panel controllers. Portions corresponding to those of FIG. 19 are denoted by similar reference numerals, and repeated explanation will be omitted.

In the drawing, the control unit 194 includes the computer 194a for controlling the touch responsive display unit, and the touch panel controllers 194b and 194c for respectively operating the touch panels 191 and 193 under control of the computer 194a.

The touch panel controller 194c causes infrared rays 195 (FIG. 19) to be emitted to the hollow portion 193b of the touch panel 193 as described above, and processes a detection output of a sensor (not shown) and supplies it to the computer 194a. When the touch panel 191 is similar in configuration to the touch panel 193, the touch panel controller 194b operates similarly to the touch panel controller 194c. When the touch panel 191 detects a touching position by a different method (e.g., resistive type for changing resistance by touching, and thereby detecting a touching position), the touch panel 191 is driven, and its position detection output is processed, and supplied to the computer 194a.

Upon having received touching position detection outputs of the touch panels 193 and 191 from the touch panel controllers 194c and 194b, the computer 194a controls the display screen 192 of the display, and executes screen displaying according to the touching position detection outputs.

Next, description will be made of a display method by the computer 4a following a user operation at the touch responsive display unit shown in FIG. 19 according to an embodiment of the present invention by referring to FIGS. 20A to 20C and FIG. 4. FIGS. 20A to 20C are views, each schematically showing a touching operation state of the user at the touch responsive display unit, and a corresponding display state on the display screen 192. A reference numeral 206 denotes a finger tip, and 207 a target touching operation portion on the display screen 192. FIG. 4 is a flowchart showing a control process of the computer 194a according to a touching operation state.

In FIG. 4, as shown in FIG. 20A, while the finger tip 206 is not touching the touch panel 193, the target touching operation portion 207 displayed on the display screen 2 is in an initial display state (step 100). Then, as shown in FIG. 20B, when the finger tip 206 touches the touch panel 193, a position detection result of the finger tip 206 on the touch panel 193 is fetched in by the computer 194a (step 101). The computer 194a executes transaction A based on this detection result, and controls displaying on the display screen 192 (step 102). Accordingly, as shown in FIG. 20B, a displaying method of the target touching operation portion 207 is changed on the display screen 192.

In the state shown in FIG. 20B, a series of steps 102, 103 and 105 are repeated as long as the process continues and, on the display screen 192, the display state shown in FIG. 20B continues.

When the finger tip 206 is returned from the state of FIG. 20B to that of FIG. 20A (step 103), the computer 194a finishes the transaction A (step 104), and returns to step 100. The display screen 192 returns to the display state of FIG. 20A.

The finger tip 206 is further advanced from the state of FIG. 20B, and set in a state of touching the touch panel 192 shown in FIG. 20C, its position is distorted, and a position detection output of the touch panel 191 is received by the computer 194a (step 105). Based on this detection result, the computer 194a executes transaction B, and controls displaying on the display screen 192 (step 106). Accordingly, as shown in FIG. 20C, a displaying method of the target touching operation portion 207 is changed on the display screen 192 differently those of FIG. 20A and 20B.

When the finger tip 206 changes from the state of FIG. 20C to FIG. 20A, a displaying method of the target touching operation portion 207 is changed from that of FIG. 20C to that of FIG. 20B, and to that of FIG. 20A. However, if the state shown in FIG. 20C indicates a final decision operation at the touch responsive display unit, when the computer 194a determines establishment of this last decision operation after the passage of a fixed period of the state shown in FIG. 20C, the display method may be immediately changed from that of FIG. 20C to that of FIG. 20A (i.e., move from step 106 to 100).

According to the present embodiment, as in the case of the first embodiment, the specific examples shown in FIGS. 5A to 8C.

According to the present embodiment, since the touch panel 191 is disposed on the rear surface of the display screen 192, erroneous operations caused by shifting can be reduced. Moreover, blur on the display screen is limited, and a good operation feel can be provided.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A touch responsive display unit comprising:
   a second touch panel disposed on a display screen, said second touch panel being operable to judge that an indicator has touched the second touch panel, when the indicator has contacted the second touch panel;
   a first touch panel disposed on the second touch panel, the first touch panel being operable to judge that an indicator has touched the first touch panel, when the indicator comes within a predetermined distance from the display screen;
   first position detecting means for detecting a touching position of the indicator on the first touch panel when the indicator designates a predetermined position on the display screen; and
   control means for executing a first transaction according to a detection result of the first position detecting means, setting a display state on the display screen to a first display state according to the touching position of the indicator on the first touch panel detected by the first position detecting means, and when a touch is detected at the second touch panel under the first display state, for executing a second transaction according to a detection result of the first position detecting means, and setting the display state on the display screen to a second display state according to the touching position of the indicator on the first touch panel detected by the first position detecting means.

2. The touch responsive display unit according to claim 1, wherein operation buttons are displayed on the display screen, the touching positions of the indicator are in positions on the first touch panel of the indicator designating the operation buttons, and the control means sets display states of the operation buttons to the first and second states according to the detection results of the first position detecting means.

3. A display method of a touch responsive display unit including a second touch panel disposed on a display screen, and a first touch panel disposed on the second touch panel, the second touch panel being operable to judge that an indicator has touched the second touch panel, when the indicator has contacted the second touch panel, and the first touch panel being operable to judge that an indicator has touched the first touch panel, when the indicator comes within a predetermined distance from the display screen, comprising the steps of:

detecting a touching position of an indicator on the first touch panel, and changing a display state on the display screen according to said touching position of the indicator on the first touch panel to set a first display state; and detecting advancing of the indicator from the state of touching on the first touch panel to touching on the second touch panel under the first display state, and changing the display state on the display screen from the first display state to a second display state according to said touching position of the indicator on the first touch panel.

4. A touch responsive display unit comprising:

a flexible paper display;

a first touch panel disposed on the flexible paper display, the first touch panel being operable to judge that an indicator has touched the first touch panel, when the indicator comes within a predetermined distance from the flexible paper display;

first position detecting means for detecting a touching position of an indicator on the first touch when the indicator designates a predetermined position on a screen of the paper display;

second detecting means for detecting a touching position of the indicator on the second touch panel when the indicator designates the predetermined position on the display screen; and control means for executing first transaction according to a detection result of the first position detecting means, and setting a display state on the display screen to a first display state according to the touching position of the indicator on the first touch panel detected by the first position detecting means, and executes second transaction according to a detection result of the second detecting means, and setting a display state on the display screen to a second display state according to the touching position on the second touch panel detected by the second position detecting means;

a second touch panel disposed under the flexible paper display, the second touch panel being operable to detect distortion caused by pressing the flexible paper display.

5. The touch responsive display unit according to claim 4, wherein a cushion material is disposed between the second touch panel and the paper display.

6. The touch responsive display unit according to claim 4, wherein operation buttons are displayed on the display screen, the touching positions of the indicator are on the first and second touch panels of the indicator designating the operation buttons, and the control means sets display states of the operation buttons to first and second display states according to the detection results of the first and second position detecting means.

7. A touch responsive display unit comprising:

a display screen;

a lower touch panel disposed on top of the display screen, said lower touch panel being operable to judge that an indicator has touched the lower touch panel, when the indicator has contacted the lower touch panel;

an upper touch panel disposed on top of the lower touch panel, the upper touch panel being operable to judge that an indicator has touched the upper touch panel, when the indicator comes within a predetermined distance from the display screen;

means for detecting touching on a first designated position with respect to a first display state of the display screen by a finger on the upper touch panel thereby displaying the indicator on the upper touch panel and a pop-up screen;

means for detecting touching by the finger on a second designated position with respect to the indicator on the lower touch panel thereby executing a predetermined operation according to the first designated position of the indicator on the upper touch panel and the pop-up screen; and means for executing said predetermined operation.

* * * * *